US012625396B2

(12) United States Patent
Lo et al.

(10) Patent No.: US 12,625,396 B2
(45) Date of Patent: May 12, 2026

(54) OPTICAL MODULATOR AND METHOD FOR MANUFACTURING THE SAME

(71) Applicant: TAIWAN SEMICONDUCTOR MANUFACTURING COMPANY LTD., Hsinchu (TW)

(72) Inventors: Wen-Shun Lo, Hsinchu County (TW); Yingkit Felix Tsui, Cupertino, CA (US); Jing-Hwang Yang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 360 days.

(21) Appl. No.: 18/314,817

(22) Filed: May 10, 2023

(65) Prior Publication Data

US 2024/0377659 A1 Nov. 14, 2024

(51) Int. Cl.
*G02F 1/015* (2006.01)

(52) U.S. Cl.
CPC .......... *G02F 1/015* (2013.01); *G02F 2201/12* (2013.01); *G02F 2202/10* (2013.01)

(58) Field of Classification Search
CPC ............................................. G02F 1/015–025
See application file for complete search history.

(56) References Cited

U.S. PATENT DOCUMENTS

| | | | | |
|---|---|---|---|---|
| 9,939,666 | B2 * | 4/2018 | Chen ..................... | G02F 1/025 |
| 2018/0364501 | A1 * | 12/2018 | Jou ......................... | G02F 1/025 |
| 2019/0006535 | A1 * | 1/2019 | Kuwajima .......... | H10F 71/1212 |
| 2024/0045240 | A1 * | 2/2024 | Shih ..................... | G02F 1/2257 |
| 2024/0310661 | A1 * | 9/2024 | Chern .................. | G02F 1/2257 |

* cited by examiner

*Primary Examiner* — Rhonda S Peace
(74) *Attorney, Agent, or Firm* — WPAT LAW; Anthony King

(57) ABSTRACT

The present disclosure provides an optical modulating structure. The optical modulating structure includes a lower member extending along an insulating layer, a first protrusion over the lower member, and a second protrusion over the lower member and separated from the first protrusion. A first mask layer is formed over the optical modulating structure, wherein the first mask layer covers the second protrusion and a first portion of the lower member between the first protrusion and the second protrusion. A first doping region is formed in an exposed portion of the lower member and at least a portion of an exposed sidewall of the first protrusion. A dielectric layer is formed between the first protrusion and the second protrusion. A method for manufacturing the optical modulating structure is also provided.

20 Claims, 28 Drawing Sheets

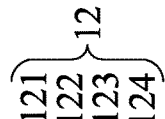
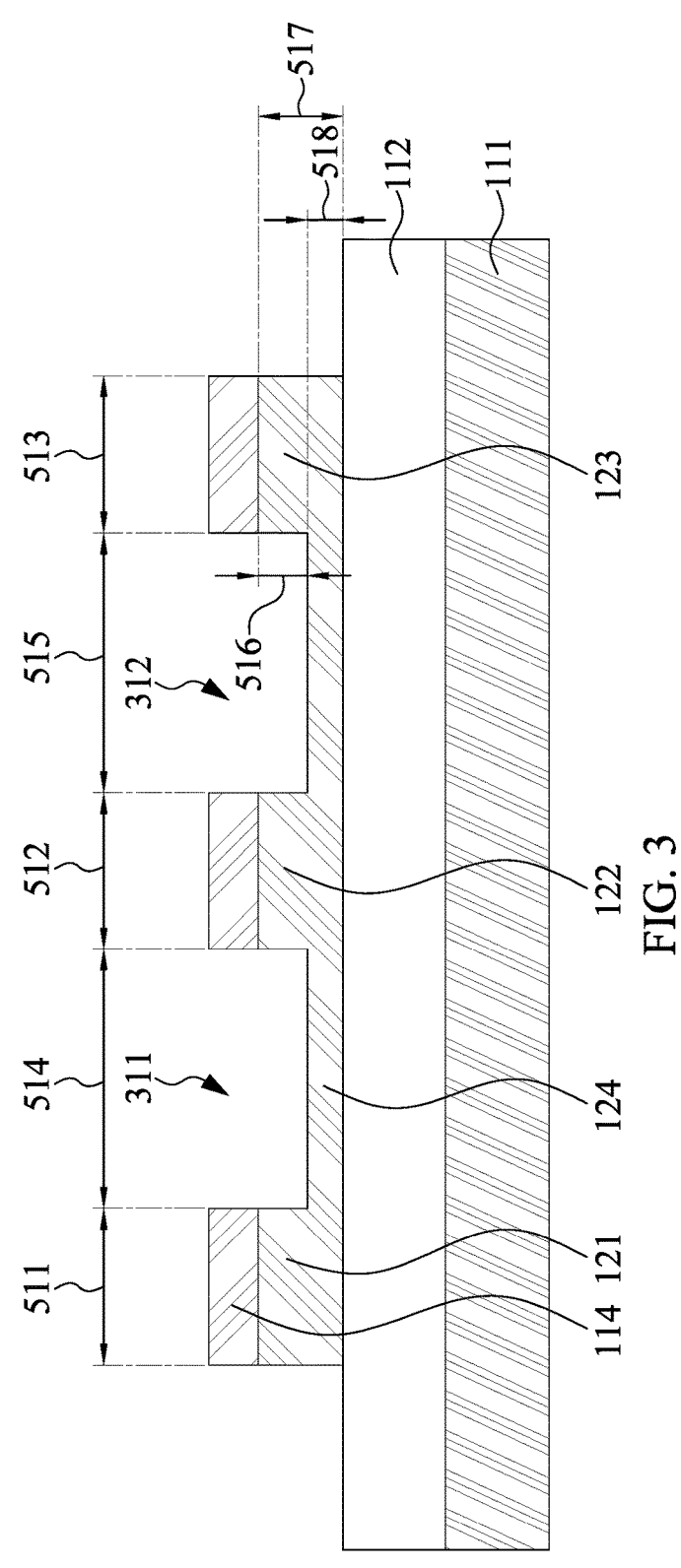
FIG. 3

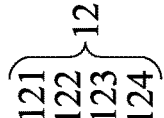
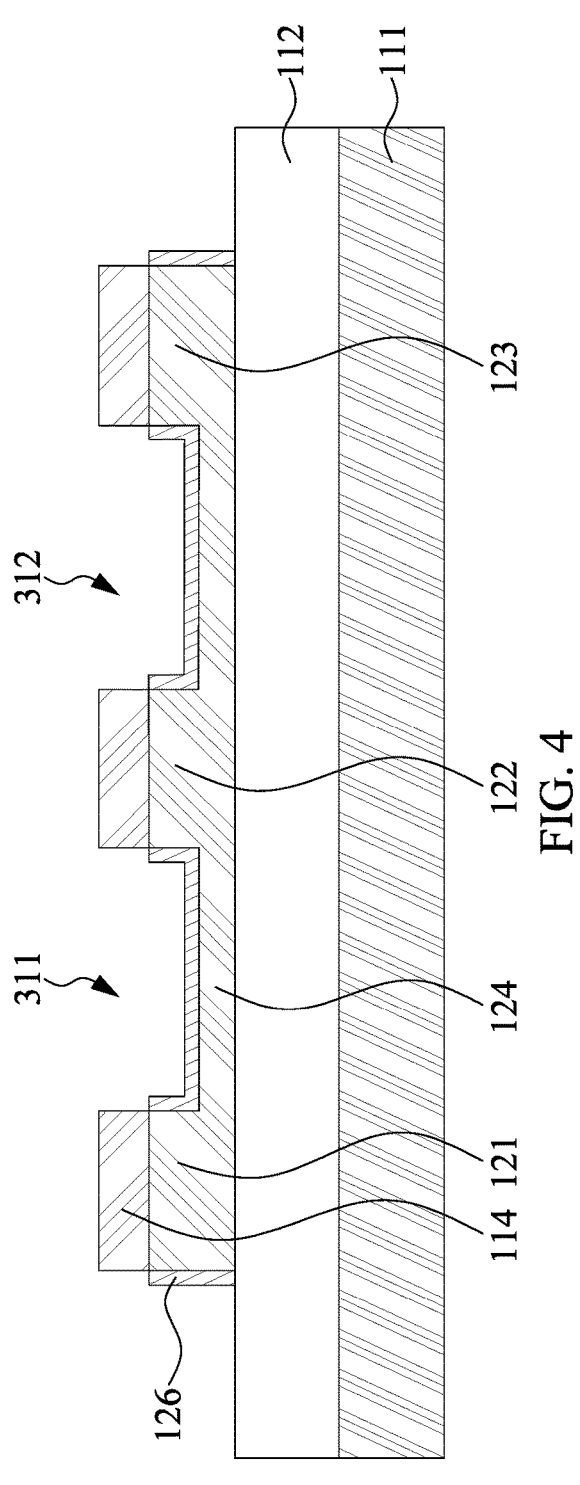
FIG. 4

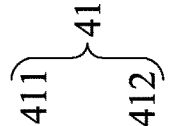
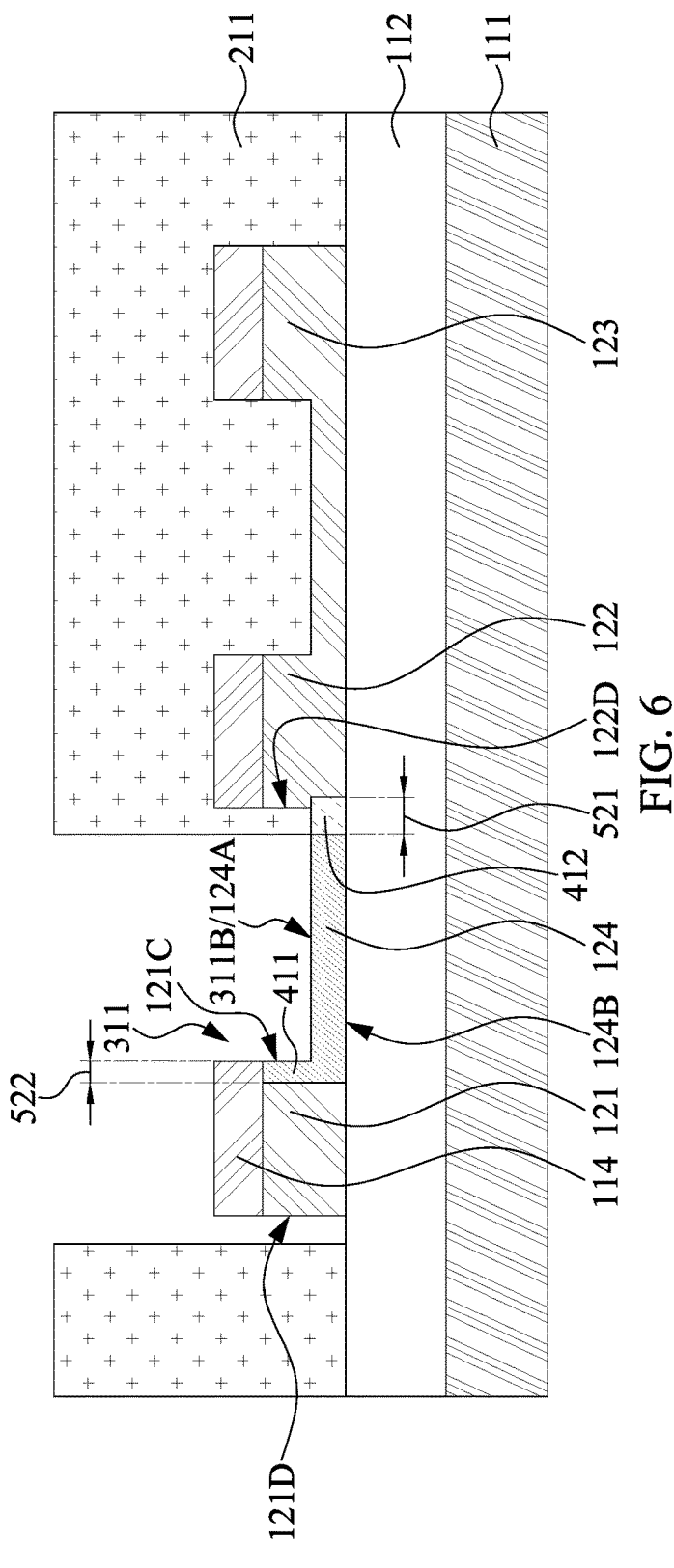
FIG. 6

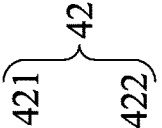
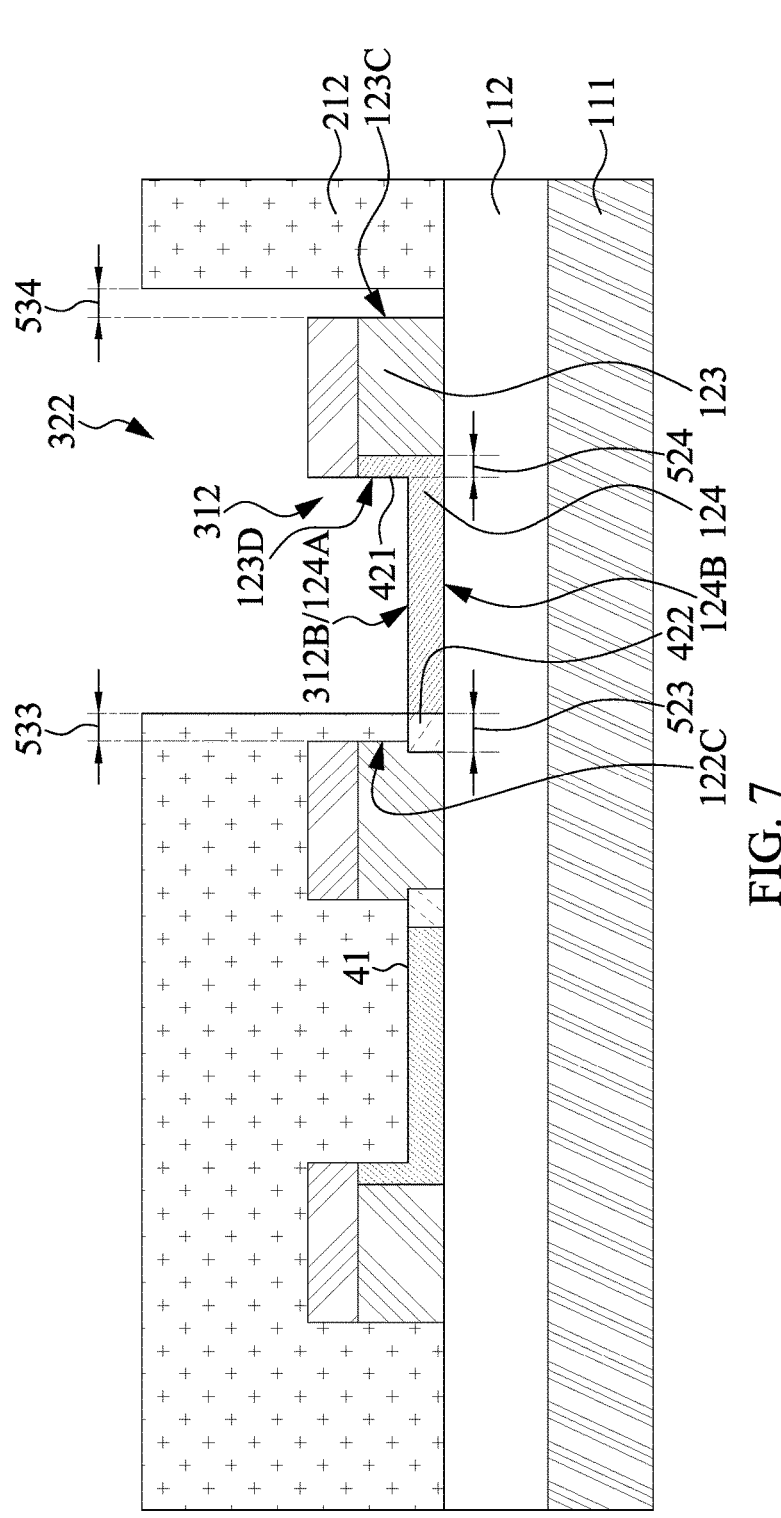
FIG. 7

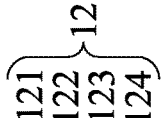
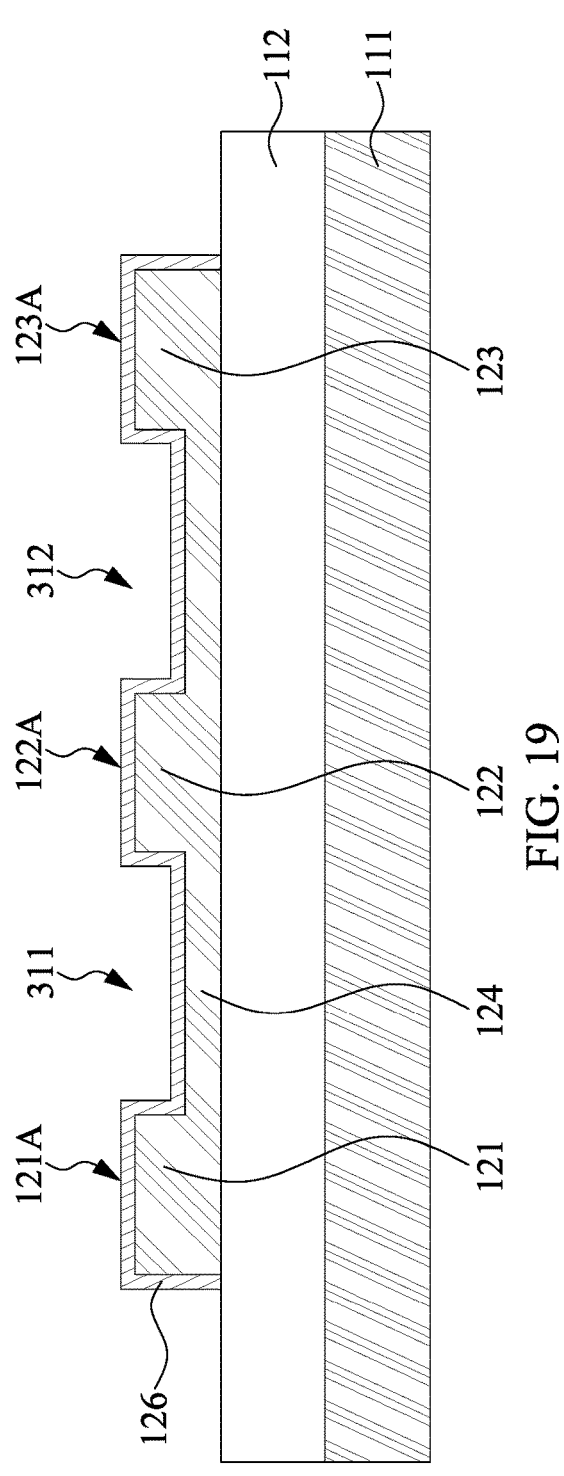
FIG. 19

101

104

121
115a
122
115b
123

C

C'

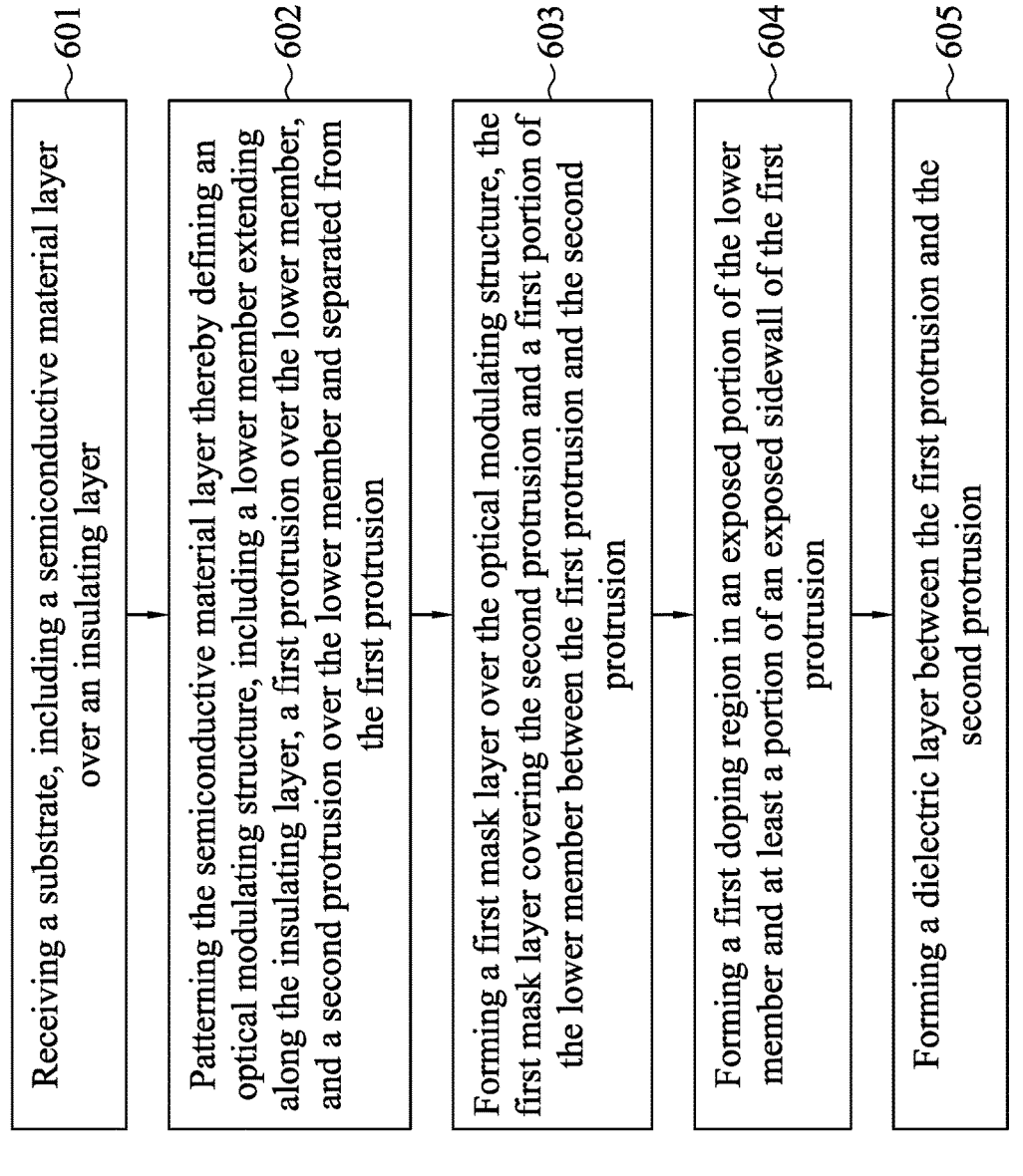

Receiving a substrate, including a semiconductive material layer over an insulating layer ～601

Patterning the semiconductive material layer thereby defining an optical modulating structure, including a lower member extending along the insulating layer, a first protrusion over the lower member, and a second protrusion over the lower member and separated from the first protrusion ～602

Forming a first mask layer over the optical modulating structure, the first mask layer covering the second protrusion and a first portion of the lower member between the first protrusion and the second protrusion ～603

Forming a first doping region in an exposed portion of the lower member and at least a portion of an exposed sidewall of the first protrusion ～604

Forming a dielectric layer between the first protrusion and the second protrusion ～605

OPTICAL MODULATOR AND METHOD FOR MANUFACTURING THE SAME

BACKGROUND

Semiconductor devices are used in a variety of electronic applications, such as personal computers, cellular phones, digital cameras, and other electronic equipment. The semiconductor devices are typically fabricated by sequentially depositing insulating or dielectric layers, conductive layers, and semiconductive layers of material over a semiconductor substrate, and patterning the various material layers using lithography to form circuit components and elements thereon. As the semiconductor industry has progressed into advanced technology process nodes in pursuit of greater device density, issues of current leakage and breakdown voltage of a capacitor have arisen.

Optical signals are used for high-speed and secure data transmission between two devices. A device capable of optical data transmission includes at least an integrated circuit having a laser die for transmitting and/or receiving optical signals, and one or more optical components, such as a waveguide for the transmission of the optical signals and a modulator for manipulating a property of the optical signal. As the semiconductor industry has progressed into advanced technology process nodes in pursuit of smaller product scales and greater modulation speeds, various approaches have been studied and an obstacle to improved modulation speeds has been encountered.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, dimensions of the various features may be arbitrarily increased or reduced for clarity of discussion.

FIGS. 1 to 18 are schematic cross-sectional diagrams at different stages of a method of manufacturing a semiconductor structure in accordance with some embodiments of the disclosure.

FIGS. 19 to 23 are schematic cross-sectional diagrams at different stages of a method of manufacturing a semiconductor structure in accordance with some embodiments of the disclosure.

FIGS. 27 and 28 are flow diagrams of methods of manufacturing a semiconductor structure in accordance with different embodiments of the present disclosure.

DETAILED DESCRIPTION

Figure 1:
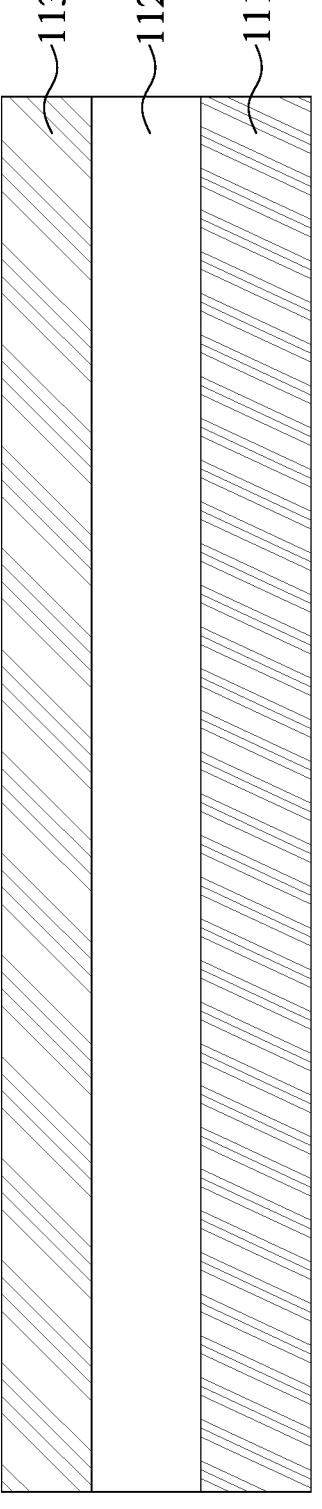

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context. In addition, the term "source/drain region" or "source/drain regions" may refer to a source or a drain, individually or collectively dependent upon the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The present disclosure provides an optical modulator (or photonic modulator) and a method for manufacturing the same. FIGS. 1 to 18 are schematic diagrams of a semiconductor structure at different stages of the method. For a purpose of clarity and simplicity, reference numbers of elements with same or similar functions are repeated in different embodiments. However, such usage is not intended to limit the present disclosure to specific embodiments or specific elements. In addition, conditions or parameters illustrated in different embodiments can be combined or modified to form different combinations of embodiments as long as the parameters or conditions used are not in conflict.

Referring to FIG. 1, a substrate layer 111 is provided, formed or received. In some embodiments, the substrate layer 111 includes a bulk semiconductor material, such as silicon. The substrate layer 111 may include another elementary semiconductor, such as germanium; a compound semiconductor including silicon carbide, gallium arsenic, gallium phosphide, indium phosphide, indium arsenide, or indium antimonide; an alloy semiconductor including SiGe, GaAsP, AlInAs, AlGaAs, GaInAs, GaInP, or GaInAsP; or combinations thereof. An insulating layer 112 and a semiconductive material layer 113 can be sequentially formed over the substrate layer 111. In some embodiments, the substrate layer 111, the insulating layer 112 and the semiconductive material layer 113 are collectively referred to as a semiconductor-on-insulator (SOI). In some embodiments, the semiconductive material layer 113 is formed by an epitaxial growth. In some embodiments, a thickness of the semiconductive material layer 113 is in a range of 2500 to 5000 angstroms (Å). In some embodiments, the insulating layer 112 includes oxide (e.g., silicon oxide).

Figure 2:
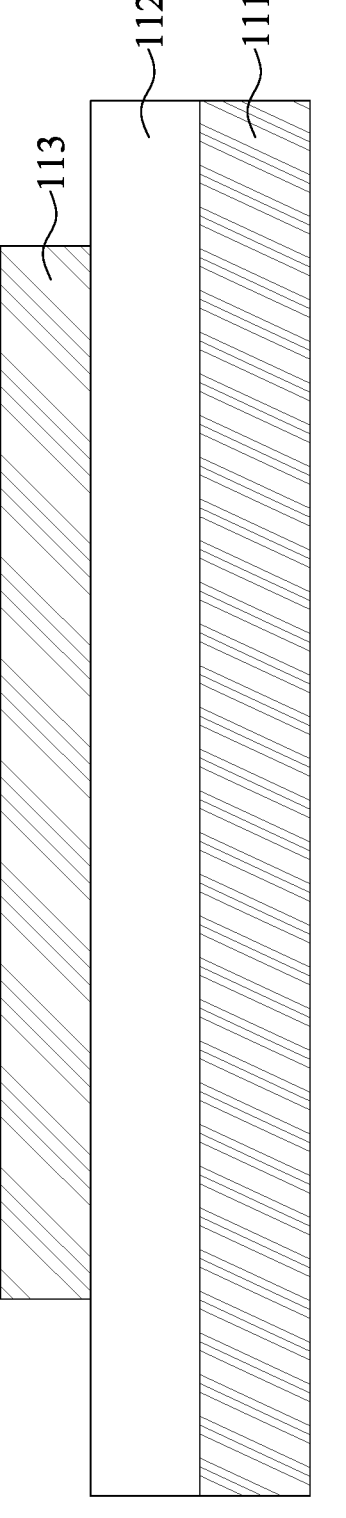

Referring to FIGS. 2 to 3, the semiconductive material layer 113 is patterned to form an optical modulating structure 12 as shown in FIG. 3. The formation of the optical modulating structure 12 may include multiple patterning operations. In some embodiments, portions of the semiconductive material layer 113 are removed by a first pattering operation, and portions of the insulating layer 112 are exposed as shown in FIG. 2. In some embodiments, a coverage area and a total width of the optical modulating structure 12 is defined by the first patterning operation as shown in FIG. 2. In some embodiments, a hard mask layer 114 is formed covering portions of the semiconductive material layer 113 after the first patterning operation shown in FIG. 2. Portions of the semiconductive material layer 113 are removed using the hard mask layer 114 as a mask in a second patterning operation, and openings 311 and 312 are thereby formed as shown in FIG. 3. In some embodiments, a thickness of the hard mask layer 114 is in a range of 500 to 1500 Å. In some embodiments, the hard mask layer 114 includes nitride (e.g., silicon nitride).

The optical modulating structure 12 includes a first protrusion 121, a second protrusion 122, a third protrusion 123 and a lower member 124. In some embodiments, the lower member 124 extends along a top surface of the insulating layer 112 and across an entire width of the optical modulating structure 12. In some embodiments, the first protrusion 121, the second protrusion 122 and the third protrusion 123 protrude from the lower member 124. In some embodiments, the second protrusion 122 is between the first and third protrusions 121 and 123. In some embodiments, the protrusions 121, 122 and 123 are separated from each other by the first opening 311 and the second opening 312. In some embodiments, the first opening 311 is defined by sidewalls of the first protrusion 121 and the second protrusion 122 and a top surface of the lower member 124. In some embodiments, the second opening 312 is defined by sidewalls of the second protrusion 122 and the third protrusion 123 and the top surface of the lower member 124.

The first protrusion 121 may have a width 511 in a range of 3 to 10 microns (μm). The second protrusion 122 may have a width 512 in a range of 0.1 to 1.0 μm. A width 513 of the third protrusion 123 can be substantially equal to or less than the width 511 depending on different applications. In some embodiments, the width 513 is in a range of 0.2 to 3 μm. In some embodiments, the width 513 is substantially greater than the width 512. In some embodiments, a width 514 of the first opening 311 is substantially equal to a width 515 of the second opening 312. In some embodiments, the width 514 or 515 is in a range of 1 to 5 μm. A height 517 of the optical modulating structure 12 may be substantially equal to the thickness of the semiconductive material layer 113 as shown in FIG. 1. In some embodiments, the height 517 is in a range of 2500 to 4000 Å. In some embodiments, depths of the first opening 311 and the second opening 312 are substantially equal. In some embodiments, the depth 516 of the first opening 311 or the second opening 312 is in a range of 1000 to 2500 Å. A thickness 518 of the lower member 124 may be equal to the height 517 minus the depth 516. In some embodiments, the thickness 518 is in a range of 400 to 1500 Å.

It should be noted that parameters or dimensions of the first protrusion 121, the second protrusion 122, the third protrusion 123, the lower member 124, the first opening 311 and the second opening 312 can depend on different applications. In some embodiments, the first protrusion 121 and the third protrusion 123 function as two electrodes of the optical modulating structure 12, and the second protrusion 122 is a diode junction after a doping operation in subsequent processing.

Referring to FIG. 4, an oxide layer 126 is formed over exposed surfaces of the optical modulating structure 12. In some embodiments, the oxide layer 126 is formed by an oxidation on the exposed surfaces of the optical modulating structure 12. In some embodiments, the oxide layer 126 is a linear layer conformal to a profile of the exposed surfaces of the optical modulating structure 12. In some embodiments, a thickness of the oxide layer 126 is in a range of 30 to 200 Å. The exposed surfaces of the optical modulating structure 12 can be damaged by previous processing (e.g., the multiple patterning operations), and the formation of the oxide layer 126 is to remove the damaged surfaces of the optical modulating structure 12.

Figure 5:
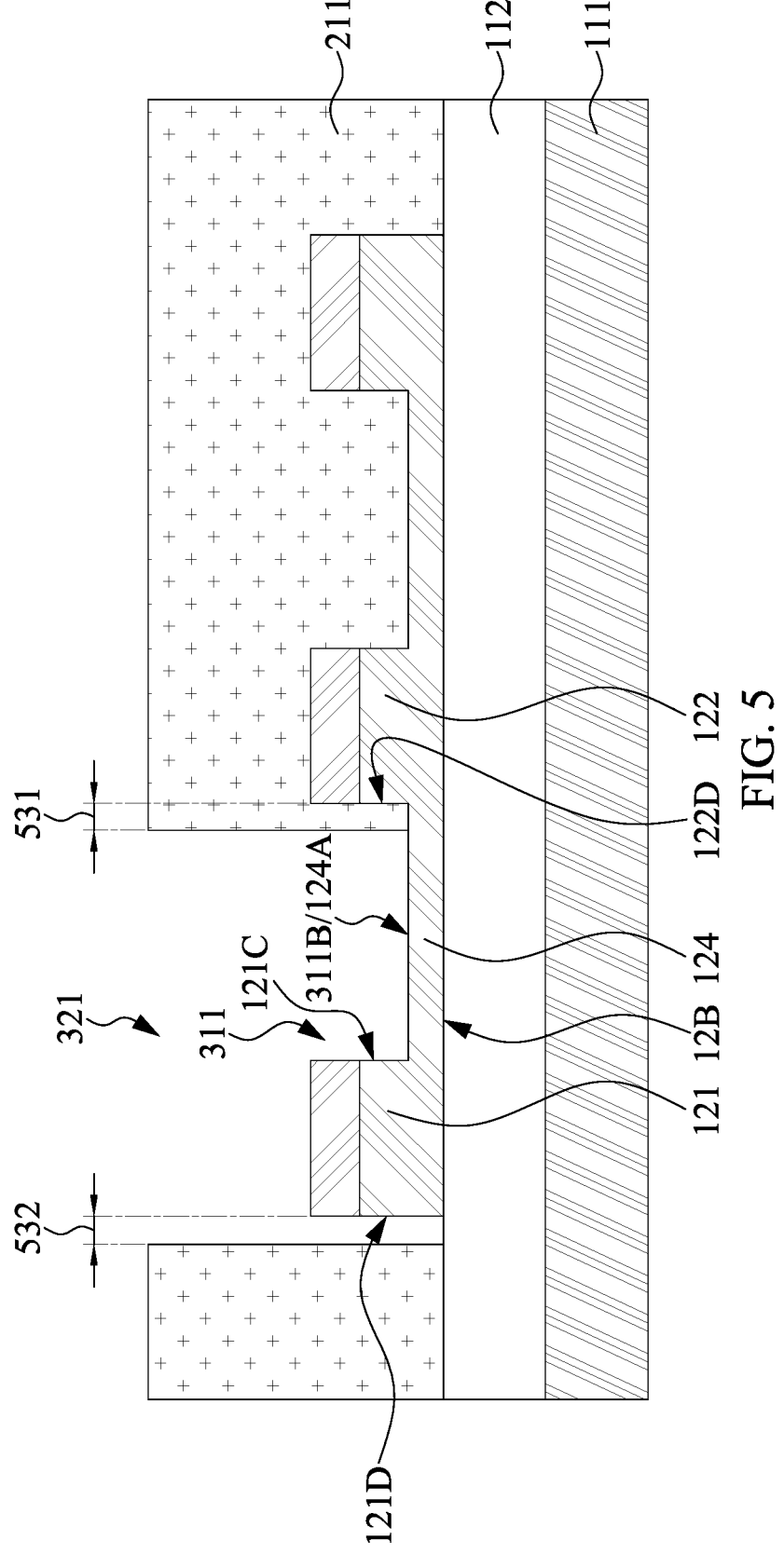

Referring to FIGS. 5 to 6, a first doping region 41 is formed in a portion of the optical modulating structure 12. In some embodiments, a photoresist layer 211 is formed over the optical modulating structure 12 and the insulating layer 112 as shown in FIG. 5, and a first implantation is performed as shown in FIG. 6. In some embodiments, the first doping region 41 has an overall doping concentration in a range of 5.0E19 to 2.0E20 per cubic centimeter (cm$^3$).

As shown in FIG. 5, the photoresist layer 211 may expose the portion of the optical modulating structure 12 where the first doping region 41 is to be formed, and the photoresist layer 211 may cover a remainder of the optical modulating structure 12. In some embodiments, the photoresist layer 211 at least covers the second protrusion 122, the second opening 312 and the third protrusion 123. In some embodiments, the photoresist layer 211 also covers a portion of the first opening 311. In some embodiments, a portion of the photoresist layer 211 is vertically over a first portion of the lower member 124 disposed between the first protrusion 121 and the second protrusion 122. In other words, the photoresist layer 211 covers a peripheral portion of a bottom surface 311B of the first opening 311 (i.e., a peripheral portion of a top surface 124A of the lower member 124) adjacent to the second protrusion 122. In some embodiments, a width 531 of the portion of the photoresist layer 211 from a sidewall 122D of the second protrusion 122 is in a range of 2 to 10 μm.

In some embodiments, the photoresist layer 211 includes an opening 321 to expose at least an entirety of the first protrusion 121 and a portion of the lower member 124 between the first protrusion 121 and the second protrusion 122. In some embodiments, the photoresist layer 211 further exposes a portion of the insulating layer 112 in the opening 321 to ensure that the entirety of the first protrusion 121 is exposed. In some embodiments, a distance 532 between a sidewall of the opening 321 and a sidewall 121D of the first protrusion 121 is in a range of 0.1 to 0.6 μm. In some embodiments, the sidewall 121D and a sidewall 121C of the first protrusion 121 opposite to the sidewall 121D are both exposed during the first implantation. In some embodiments, the sidewall 121D defines an outer sidewall of the optical modulating structure 12.

As shown in FIG. 6, the first implantation is performed to form the first doping region 41. In some embodiments, the first implantation is performed on at least the exposed portion of the lower member 124 in the opening 311. In some embodiments, a tilt angle of the first implantation with respect to a vertical direction is in a range of 0 to 20 degrees. In some embodiments, the first implantation includes a tilt implantation, and the tilt angle of the first implantation is in a range of 5 to 20 degrees. In some embodiments, an energy of the first implantation is in a range of 5 to 30 kiloelectron-volts (KeV). In some embodiments, a dosage of the first implantation is in a range of 1.0E15 to 3.0E15 per square centimeter ($cm^2$). In some embodiments, the first implantation includes a first dopant having a first conductivity type (e.g., n-type dopant).

The first doping region 41 is thereby formed. In some embodiments, the first doping region 41 is formed in the exposed portion of the lower member 124 and extends from the bottom surface 311B of the first opening 311 (or a portion of the top surface 124A of the lower member 124) to a bottom surface 124B of the lower member 124. In some embodiments, the first doping region 41 includes a first sub-region 411 formed in a portion of the first protrusion 121 adjacent to the exposed portion of the lower member 124. In some embodiments, the first sub-region 411 of the first doping region 41 extends from the sidewall 121C toward the sidewall 121D for a distance 522, wherein the distance 522 is in a range of 0.5 to 1.2 μm.

In some embodiments, the first doping region 41 includes a second sub-region 412 formed in the first portion of the lower member 124 vertically overlapped by the photoresist layer 211 due to the tilt implantation. In some embodiments, the second sub-region 412 includes a doping gradient gradually decreasing from the exposed portion of the lower member 124 toward the second protrusion 122. The second sub-region 412 may extend beyond the second protrusion 122 as shown in FIG. 6 or stop before reaching a sidewall 122D of the second protrusion 122, depending on parameters of the first implantation and conditions of the process of different applications. In some embodiments, a width 521 of the second sub-region 412 is in a range of 0.3 to 1.0 μm. In some embodiments, the width 521 of the second sub-region 412 is greater than 0.5 μm. Similarly, the first sub-region 411 may also include a doping gradient (not shown in the figures) toward the sidewall 121D. However, dopants may be concentrated in the first sub-region 411 having the width 522 as shown in FIG. 6, and the doping gradient of the first sub-region 411 can extend from a boundary of the first sub-region 411 shown in FIG. 6 toward further inside the first protrusion 121. The first sub-region 411 may further include another doping gradient (not shown in the figures) at a surficial portion of the first protrusion 121 having a doping concentration decreasing toward the top surface of the first protrusion 121 due to the hard mask layer 114. For ease of illustration, the doping gradient at the surficial portion of the first protrusion 121 is omitted from the figures, but such omission is not intended to limit the present disclosure. The photoresist layer 211 may be removed after the first implantation.

Referring to FIG. 7, the operations as depicted in FIGS. 5 to 6 are repeated to form a second doping region 42 in another portion of the optical modulating structure 12. In some embodiments, a photoresist layer 212 is formed over the optical modulating structure 12 and the insulating layer 112, and a second implantation is performed on an exposed portion of the optical modulating structure 12. In some embodiments, the second doping region 42 has an overall doping concentration in a range of 5.0E19 to 2.0E20 per cubic centimeter ($cm^3$).

The photoresist layer 212 may expose the portion of the optical modulating structure 12 where the second doping region 42 is to be formed, and the photoresist layer 212 may cover a remainder of the optical modulating structure 12. In some embodiments, the photoresist layer 211 at least covers the second protrusion 122, the first opening 311 and the first protrusion 121. In some embodiments, the photoresist layer 212 also covers a portion of the second opening 312. In some embodiments, a portion of the photoresist layer 212 is vertically over a second portion of the lower member 124 between the second protrusion 122 and the third protrusion 123. In some embodiments, a width 533 of the portion of the photoresist layer 212 from a sidewall 122C of the second protrusion 122 opposite to the sidewall 122D is in a range of 2 to 10 μm.

In some embodiments, the photoresist layer 212 includes an opening 322 to expose at least an entirety of the third protrusion 123 and a portion of the lower member 124 disposed between the second protrusion 122 and the third protrusion 123. In some embodiments, the photoresist layer 212 further exposes a portion of the insulating layer 112 in the opening 322 to ensure that the entirety of the third protrusion 123 is exposed. In some embodiments, a distance 534 between a sidewall of the opening 312 and a sidewall 123C of the third protrusion 123 is in a range of 0.1 to 0.6 μm. In some embodiments, the sidewall 123C and a sidewall 123D of the third protrusion 123 opposite to the sidewall 123C are both exposed during the second implantation. In some embodiments, the sidewall 123C defines an outer sidewall of the optical modulating structure 12.

As shown in FIG. 7, the second implantation is performed to form the second doping region 42. In some embodiments, the second implantation is performed on at least the exposed portion of the lower member 124 in the opening 312. In some embodiments, a tilt angle of the second implantation with respect to the vertical direction is in a range of 0 to 20 degrees. In some embodiments, the second implantation includes a tilt implantation, and the tilt angle of the second implantation is in a range of 5 to 20 degrees. In some embodiments, an energy of the second implantation is in a range of 2 to 10 KeV. In some embodiments, a dosage of the second implantation is in a range of 1.0E15 to 3.0E15 per square centimeter ($cm^2$). In some embodiments, the second implantation includes a second dopant having a second conductivity type different from that of the first dopant (e.g., p-type dopant).

The second doping region 42 is thereby formed. In some embodiments, the second doping region 42 is formed in the exposed portion of the lower member 124 in the opening 312 and extends from a bottom surface 312B of the second opening 312 (or a portion of the top surface 124A of the lower member 124) to the bottom surface 124B of the lower member 124. In some embodiments, the second doping region 42 includes a first sub-region 421 formed in a portion of the third protrusion 123 adjacent to the exposed portion of the lower member 124 in the opening 312. In some embodiments, the first sub-region 421 of the second doping region 42 extends from the sidewall 123D toward the sidewall 123C for a distance 524 in a range of 0.5 to 1.2 μm. In some embodiments, the second doping region 42 includes a second sub-region 422 formed in the second portion of the lower member 124 vertically overlapped by the photoresist layer 212 due to the tilt implantation. In some embodiments, the second sub-region 422 includes a doping gradient gradually decreasing from the exposed portion of the lower member 124 toward the second protrusion 122. The second sub-region 422 may extend beyond the second protrusion 122 as shown in FIG. 6 or stop before reaching a sidewall 122C of the second protrusion 122 depending on parameters of the second implantation and conditions of the process of different applications. In some embodiments, a width 523 of the second sub-region 422 is in a range of 0.3 to 1.0 μm. In some embodiments, the width 523 of the second sub-region 422 is greater than 0.5 μm. Similarly, the first sub-region 421 may also include a doping gradient (not shown in the figures). However, dopants may be concentrated in the first sub-region 421 having the width 524 as shown in FIG. 7, and the doping gradient of the first sub-region 421 can extend from a boundary of the first sub-region 421 shown in FIG. 7 toward further inside the third protrusion 123.

Figure 8:
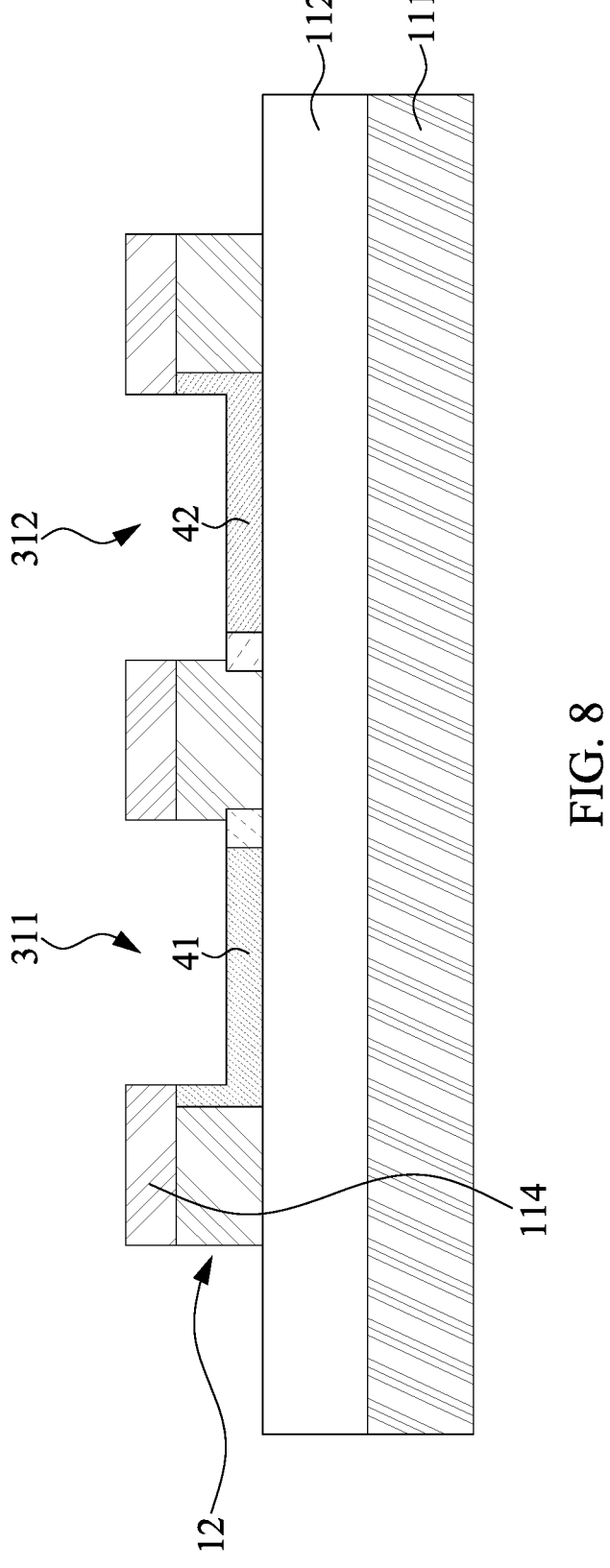

Referring to FIG. 8, the photoresist layer 212 is removed after the second implantation. The optical modulating structure 12, the hard mask layer 114 and the insulating layer 112 are exposed.

Figure 9:
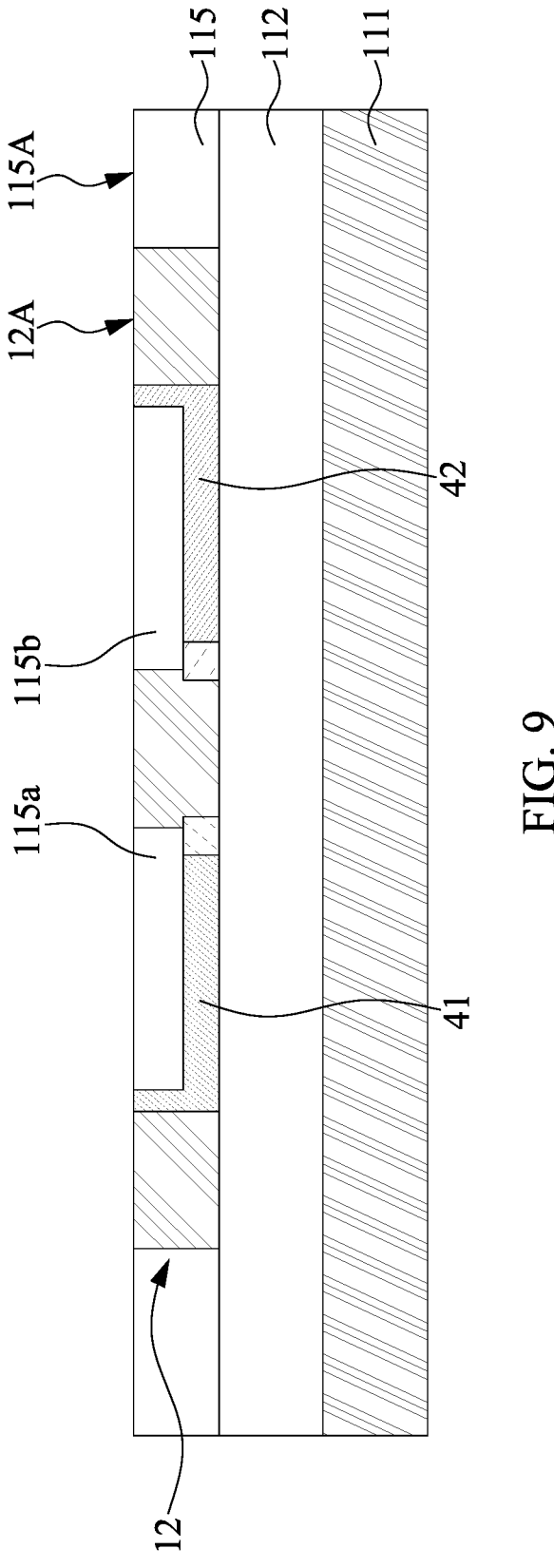

Referring to FIG. 9, the hard mask layer 114 in FIG. 8 is removed, and a dielectric layer 115 is formed. In some embodiments, a deposition of a dielectric material of the dielectric layer 115 is performed. In some embodiments, the dielectric material of the dielectric layer 115 includes oxide (e.g., silicon oxide). In some embodiments, the dielectric material of the dielectric layer 115 is different from that of the hard mask layer 114. In some embodiments, the dielectric layer 115 includes same dielectric materials as those of the hard mask layer 114 or the insulating layer 112. In some embodiments, the dielectric material covers the hard mask layer 114 and the optical modulating structure 12 after the deposition. In some embodiments, a planarization is performed on the dielectric material to form the dielectric layer 115 as shown in FIG. 9. In some embodiments, the planarization includes a chemical mechanical polish (CMP). In some embodiments, the planarization is performed on the dielectric material and stops upon an exposure of the optical modulating structure 12. In some embodiments, the dielectric layer 115 has a top surface 115A (including top surfaces of the protrusions 121, 122 and 123) substantially aligned with a top surface 12A of the optical modulating structure 12. In some embodiments, the dielectric layer 115 includes a first portion 115a filling the first opening 311 between the first protrusion 121 and the second protrusion 122, and a second portion 115b filling the second opening 312 between the second protrusion 122 and the third protrusion 123. In some embodiments, the hard mask layer 114 is removed prior to the planarization by, for example, an etching operation. In some embodiments, the hard mask layer 114 is removed by the planarization.

Figure 10:
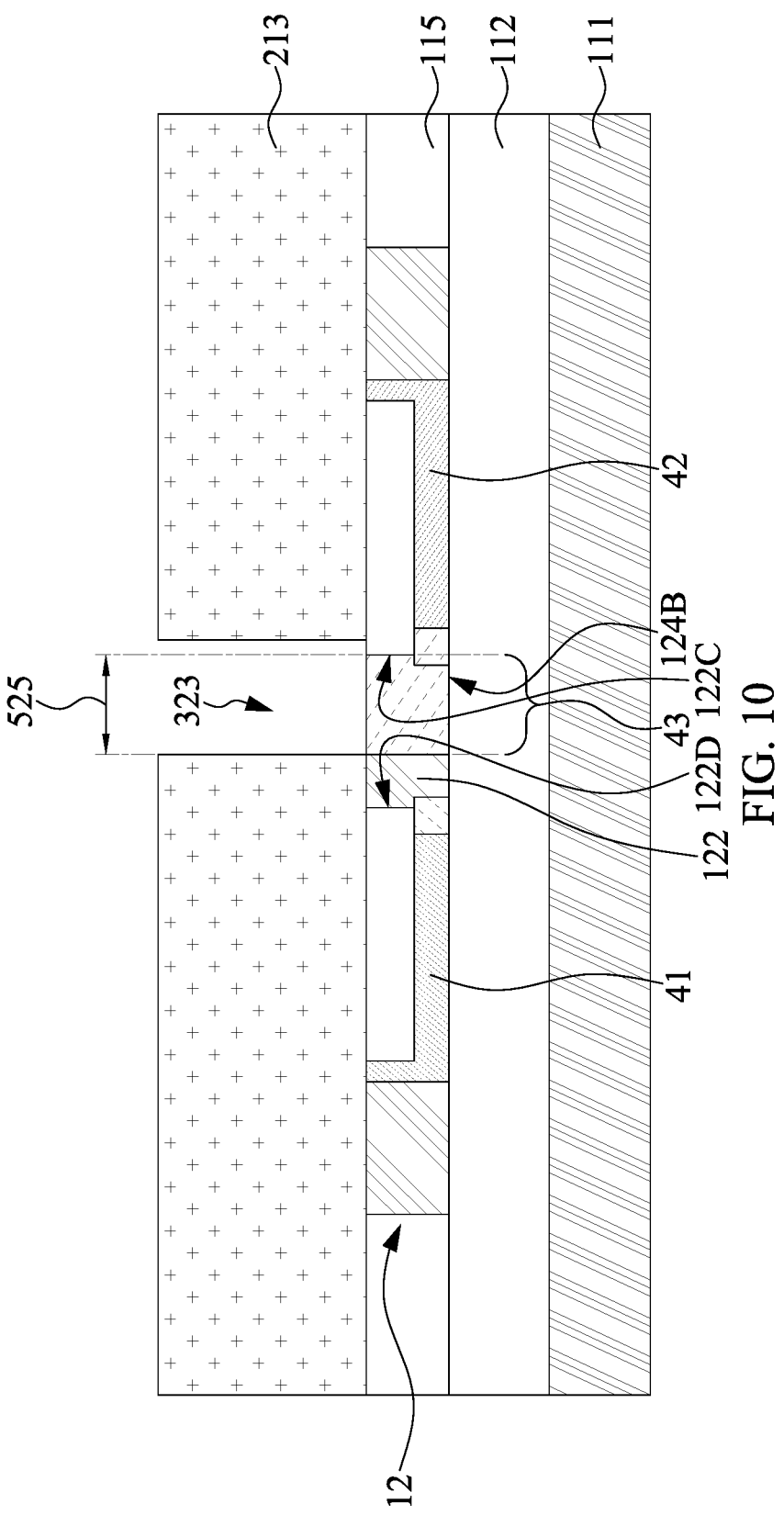

Referring to FIG. 10, operations similar to those depicted in FIGS. 5 to 6 are performed to form a third doping region 43 in the second protrusion 122 of the optical modulating structure 12. In some embodiments, a photoresist layer 213 is formed over the optical modulating structure 12 and the dielectric layer 115, and a third implantation is performed on an exposed portion of the optical modulating structure 12. The photoresist layer 213 may expose a portion of the second protrusion 122 where the third doping region 43 is to be formed, and the photoresist layer 213 may cover a remainder of the optical modulating structure 12. The third implantation can be a vertical implantation or a tilt implantation. In some embodiments, a tilt angle of the third implantation with respect to the vertical direction is in a range of 0 to 20 degrees.

In some embodiments, the photoresist layer 213 includes an opening 323 to expose the portion of the second protrusion 122. In some embodiments, the opening 323 overlaps a portion of the second portion of the lower member 124 adjacent to the second protrusion 122 to ensure that the sidewall 122C of the second protrusion 122 is within the opening 323 from a top view. In some embodiments, only a portion of the second protrusion 122 is exposed by the opening 323 to form a P/N junction within the second protrusion 122 in subsequent processing. Since the dielectric layer 115 over the lower member 124 may block dopants from being implanted into the lower member 124 disposed thereunder, a portion of the lower member 124 within the opening 323 from the top view may receive zero or very few dopants during the third implantation. For case of illustration, the third doping region 43 is defined only in the second protrusion 122 and the portion of the lower member 124 overlapped by the second protrusion 122, and any dopants implanted into the portion of the lower member 124 adjacent to the second protrusion 122 are ignored. In some embodiments, a width 525 of the third doping region 43 measured from the sidewall 122C toward the sidewall 122D is about ⅔ to ⅘ of the width 512 of the second protrusion 122 shown in FIG. 3. In some embodiments, the third doping region 43 extends from the top surface of the second protrusion 122 to the bottom surface 124B of the lower member 124.

In some embodiments, the third implantation includes the second dopant. In some embodiments, a doping concentration of the third doping region 43 is less than those of the first or second doping region 41 or 42. In some embodiments, the doping concentration of the third doping region 43 is in a range of $1.0E18$ to $8.0E18$ per $cm^3$. In some embodiments, an energy of the third implantation is in a range of 10 to 70 KeV. In some embodiments, a dosage of the third implantation is in a range of $3.0E13$ to $2.0E14$ per $cm^2$.

Figure 11:
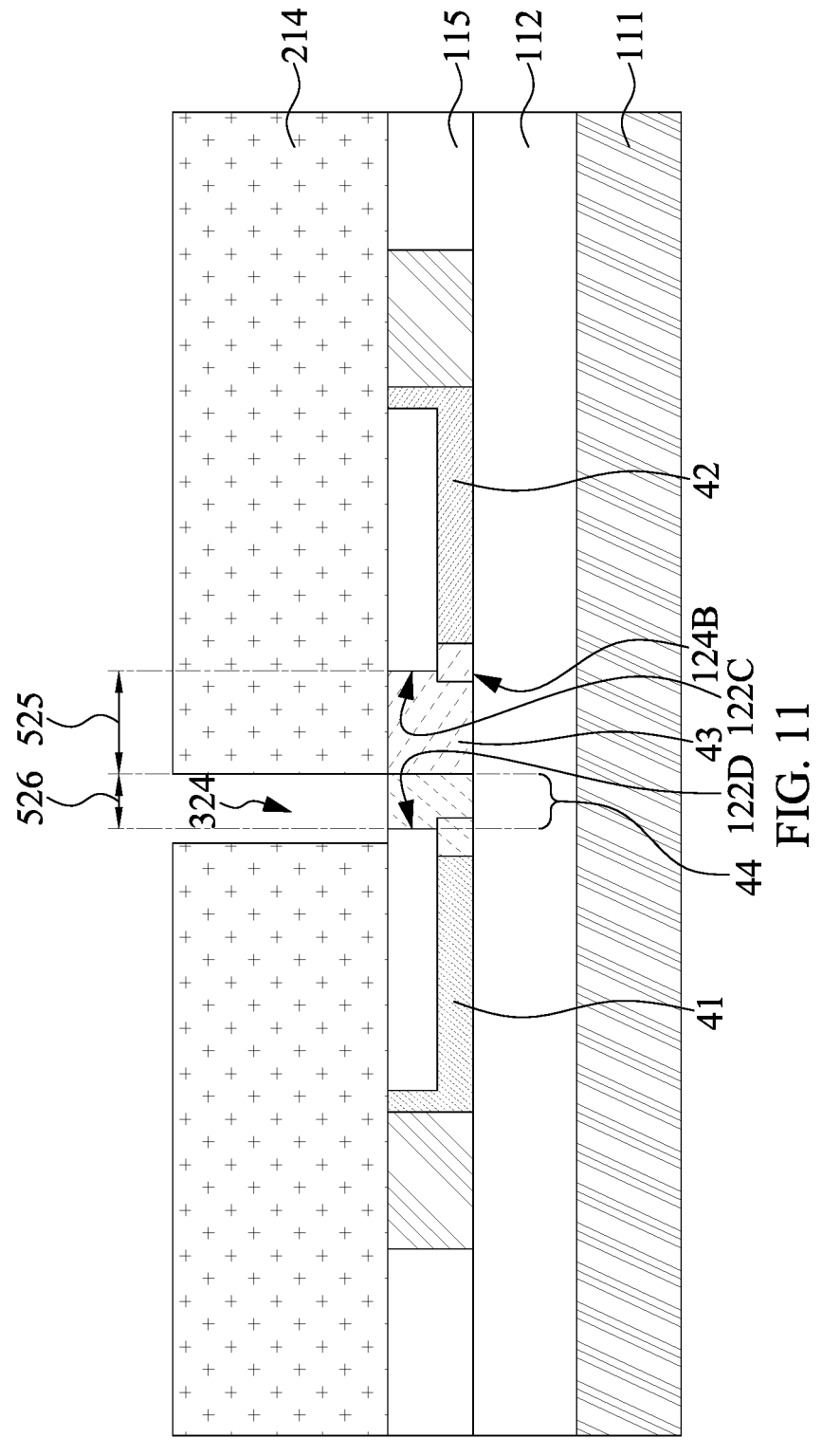

Referring to FIG. 11, the operations depicted in FIG. 10 are repeated to form a fourth doping region 44 in the second protrusion 122 adjacent to the third doping region 43. In some embodiments, a photoresist layer 214 is formed over the optical modulating structure 12 and the dielectric layer 115, and a fourth implantation is performed on an exposed portion of the optical modulating structure 12. The photoresist layer 214 may expose another portion of the second protrusion 122, and the photoresist layer 214 may cover a remainder of the optical modulating structure 12. The fourth implantation can be a vertical implantation or a tilt implantation. In some embodiments, a tilt angle of the fourth implantation with respect to the vertical direction is in a range of 0 to 20 degrees.

In some embodiments, the photoresist layer 214 includes an opening 324 to expose the another portion of the second protrusion 122. In some embodiments, the opening 324 overlaps a portion of the first portion of the lower member 124 adjacent to the second protrusion 122 to ensure that the sidewall 122D of the second protrusion 122 is within the opening 324 from a top view. In some embodiments, only a portion of the second protrusion 122 is exposed by the opening 324 to form a P/N junction within the second protrusion 122 between the doping regions 43 and 44. Since the dielectric layer 115 over the lower member 124 may block the dopants from being implanted into the lower member 124 disposed thereunder, a portion of the lower member 124 within the opening 324 from the top view may receive zero or very few dopants during the fourth implantation. For case of illustration, the fourth doping region 44 is defined only in the second protrusion 122 and the portion of the lower member 124 overlapped by the second protrusion 122, and any dopants implanted into the portion of the lower member 124 adjacent to the second protrusion 122 are ignored. In some embodiments, a width 526 of the fourth doping region 44 measured from the sidewall 122D toward the sidewall 122C is about ⅓ to ⅕ of the width 512 of the second protrusion 122 shown in FIG. 3. In other words, a ratio of the width 526 to the width 525 is in a range of 1:2 to 1:4. In some embodiments, the fourth doping region 44 extends from the top surface of the second protrusion 122 to the bottom surface 124B of the lower member 124.

In some embodiments, the fourth implantation includes the first dopant. In some embodiments, a doping concentration of the fourth doping region 44 is less than those of the first or second doping region 41 or 42. In some embodiments, the doping concentration of the fourth doping region 44 is substantially equal to that of the third doping region 43. In some embodiments, the doping concentration of the fourth doping region 44 is in a range of 1.0E18 to 8.0E18 per $cm^3$. In some embodiments, an energy of the fourth implantation is in a range of 30 to 180 KeV. In some embodiments, a dosage of the fourth implantation is in a range of 2.0E13 to 2.0E14 per $cm^2$.

Figure 12:
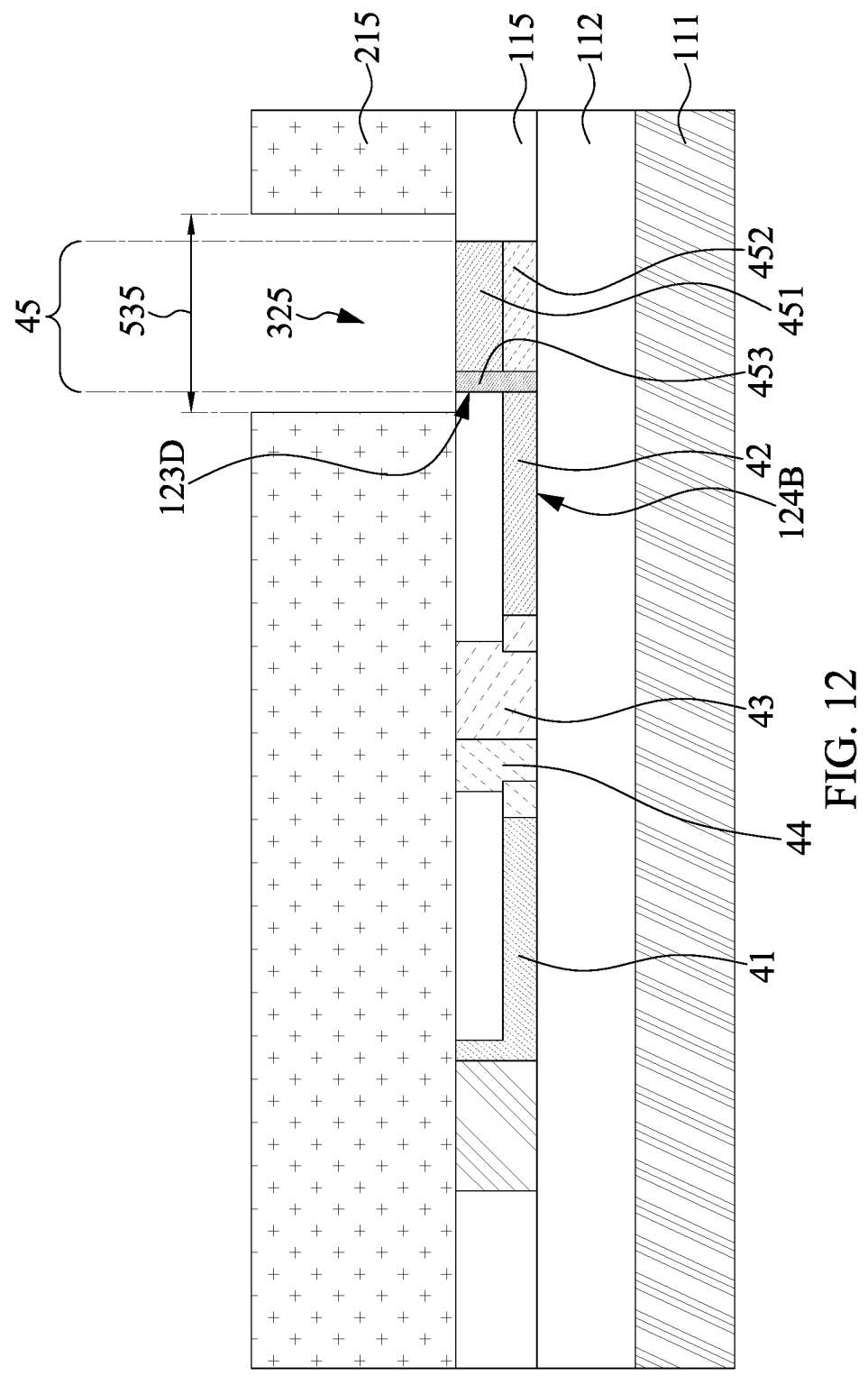

Referring to FIG. 12, operations similar to those depicted in FIG. 10 are performed to form a fifth doping region 45 in the third protrusion 123 adjacent to and overlapping the second doping region 42. In some embodiments, a photoresist layer 215 is formed over the optical modulating structure 12 and the dielectric layer 115, and a fifth implantation is performed on an exposed portion of the optical modulating structure 12. The photoresist layer 215 may expose the third protrusion 123 and cover a remainder of the optical modulating structure 12. The fifth implantation can be a vertical implantation or a tilt implantation. In some embodiments, a tilt angle of the fifth implantation with respect to the vertical direction is in a range of 0 to 20 degrees.

In some embodiments, the photoresist layer 215 includes an opening 325 to expose the third protrusion 123. In some embodiments, a width 535 of the opening 325 is greater than the width 513 of the third protrusion 123 shown in FIG. 3 to ensure that an entirety of the third protrusion 123 is exposed. In some embodiments, the entirety of the third protrusion 123 is within the opening 325 from a top view. Since the dielectric layer 115 over the lower member 124 may block dopants from being implanted into the lower member 124 disposed thereunder, a portion of the lower member 124 within the opening 325 from the top view may receive zero or very few dopants during the fifth implantation. For case of illustration, the fifth doping region 45 is defined only in the third protrusion 123 and a portion of the lower member 124 overlapped by the third protrusion 123, and any dopants implanted into a portion of the lower member 124 not overlapped by the third protrusion 123 are ignored.

In some embodiments, the fifth implantation includes the second dopant. In some embodiments, an energy of the fifth implantation is in a range of 10 to 70 KeV. In some embodiments, a dosage of the second dopant of the fifth implantation is in a range of 3.0E15 to 3.0E16 per $cm^2$. In some embodiments, the fifth doping region 45 extends from a top surface of the third protrusion 123 to the bottom surface 124B of the lower member 124. The fifth implantation may target the third protrusion 123 above the lower member 124. In some embodiments, dopants of the fifth doping region 45 are concentrated in the third protrusion 123, and a first sub-region 451 of the fifth doping region 45 is defined. In some embodiments, a concentration of dopants of the fifth doping region 45 in the third protrusion 123 is greater than a concentration of dopants of the fifth doping region 45 in the portion of the lower member 124 overlapped by the third protrusion 123. In some embodiments, a second sub-region 452 of the fifth doping region 45 disposed below and connected to the first sub-region 451 is defined. In some embodiments, a doping concentration of the first sub-region 451 of the fifth doping region 45 in the third protrusion 123 is greater than an overall doping concentration of the second doping region 42. In some embodiments, the doping concentration of the first sub-region 451 is in a range of 1.0E20 to 3.0E20 per $cm^3$. In some embodiments, a doping concentration of the second sub-region 452 of the fifth doping region 45 in the lower member 124 is substantially equal to the overall doping concentration of the second doping region 42.

The second doping region 42 may overlap the fifth doping region 45 at the sidewall 123D by the distance 524 as shown in FIG. 7. In some embodiments, a third sub-region 453 is defined by the overlap region of the second doping region 42 and the fifth doping region 45. The third sub-region 453 may have a doping concentration greater than that of the first sub-region 451, that of the second sub-region 452, or that of the second doping region 42 due to multiple implantations.

Figure 13:
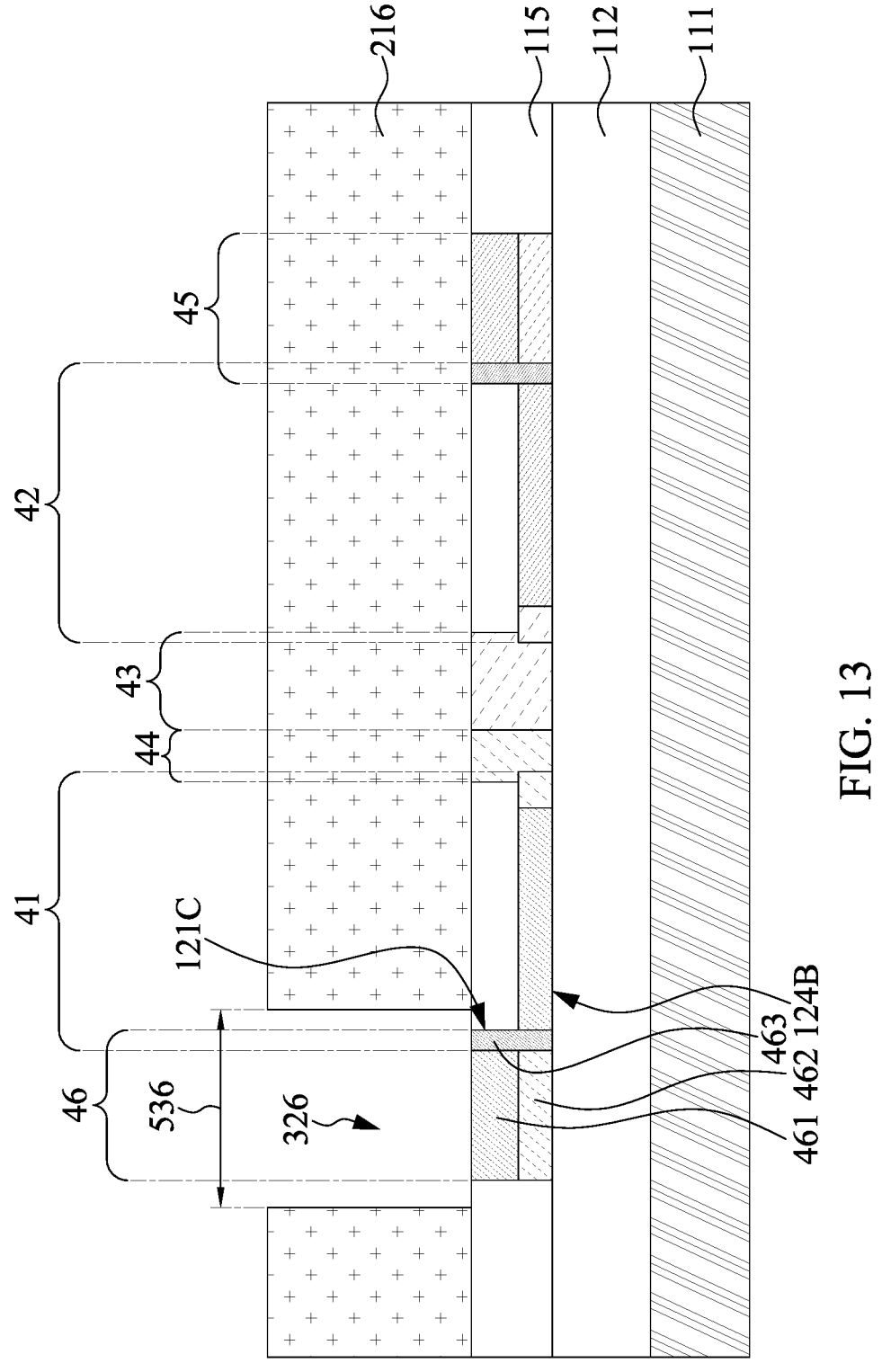

Referring to FIG. 13, operations depicted in FIG. 12 are repeated to form a sixth doping region 46 in the first protrusion 121 adjacent to and overlapping the second doping region 42. In some embodiments, a photoresist layer 216 is formed over the optical modulating structure 12 and the dielectric layer 115, and a sixth implantation is performed on an exposed portion of the optical modulating structure 12. The photoresist layer 216 may expose the first protrusion 121 and cover a remainder of the optical modulating structure 12. The sixth implantation can be a vertical implantation or a tilt implantation. In some embodiments, a tilt angle of the sixth implantation with respect to the vertical direction is in a range of 0 to 20 degrees.

In some embodiments, the photoresist layer 216 includes an opening 326 to expose the first protrusion 121. In some embodiments, a width 536 of the opening 326 is greater than the width 511 of the first protrusion 121 shown in FIG. 3 to ensure that an entirety of the first protrusion 121 is exposed. In some embodiments, the entirety of the first protrusion 121 is within the opening 326 from a top view. Since the dielectric layer 115 over the lower member 124 may block dopants from being implanted into the lower member 124 disposed thereunder, a portion of the lower member 124 within the opening 326 from the top view may receive zero or very few dopants during the sixth implantation. For case of illustration, the sixth doping region 46 is defined only in the first protrusion 121 and a portion of the lower member 124 overlapped by the first protrusion 121, and any dopants implanted into a portion of the lower member 124 not overlapped by the first protrusion 121 are ignored.

In some embodiments, the sixth implantation includes the first dopants. In some embodiments, an energy of the sixth implantation is in a range of 30 to 180 KeV. In some embodiments, a dosage of the second dopant of the fifth implantation is in a range of 2.0E15 to 3.0E16 per cm². In some embodiments, the sixth doping region 46 extends from the top surface of the first protrusion 121 to the bottom surface 124B of the lower member 124. The sixth implantation may target the first protrusion 121 above the lower member 124. In some embodiments, dopants of the sixth doping region 46 are concentrated in the first protrusion 121, and a first sub-region 461 of the sixth doping region 46 is defined. In some embodiments, a concentration of dopants of the sixth doping region 46 in the first protrusion 121 is greater than a concentration of dopants of the sixth doping region 46 in the portion of the lower member 124 overlapped by the first protrusion 121. In some embodiments, a second sub-region 462 of the sixth doping region 46 disposed below and connected to the first sub-region 461 is defined. In some embodiments, a doping concentration of the first sub-region 461 of the sixth doping region 46 in the first protrusion 121 is greater than the overall doping concentration of the first doping region 41. In some embodiments, the doping concentration of the first sub-region 461 is in a range of 1.0E20 to 3.0E20 per cm³. In some embodiments, a doping concentration of the second sub-region 462 of the sixth doping region 46 in the lower member 124 is substantially equal to the overall doping concentration of the first doping region 41.

The first doping region 41 may overlap the sixth doping region 46 at the sidewall 121C by the distance 522 as shown in FIG. 6. In some embodiments, a third sub-region 463 is defined by the overlap of the first doping region 41 and the sixth doping region 46. The third sub-region 463 may have a doping concentration greater than that of the first sub-region 461, that of the second sub-region 462, or that of the first doping region 41 due to multiple implantations.

Figure 14:
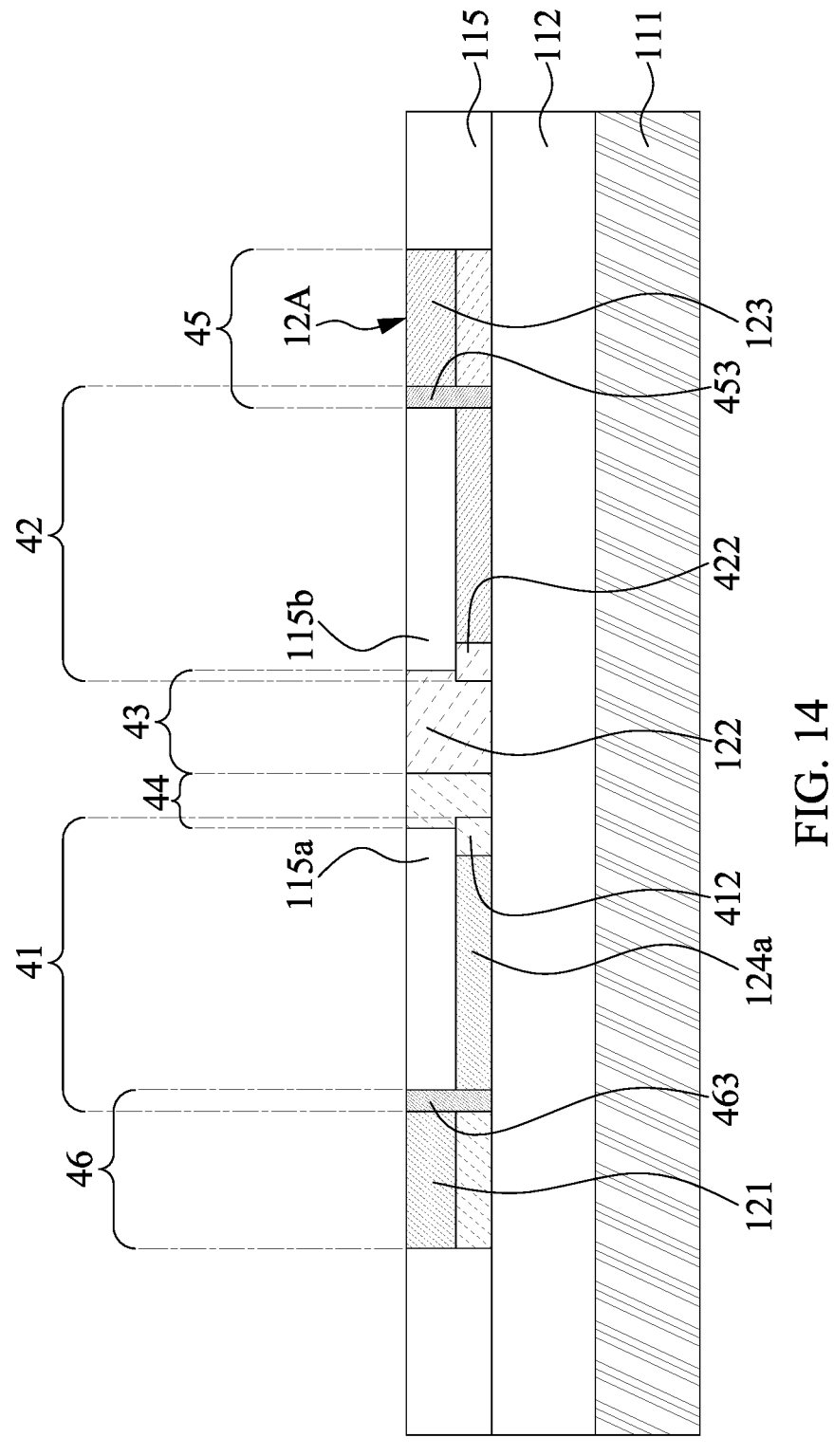

Referring to FIG. 14, the photoresist layer 216 is removed, and the optical modulating structure 12 may thereafter be referred to as an optical modulator 12. The first protrusion 121 and a portion of the lower member 124 overlapped by the first protrusion 121 may be referred to as a first electrode of the optical modulator 12. The third protrusion 123 and a portion of the lower member 124 overlapped by the third protrusion 123 may be referred to as a second electrode of the optical modulator 12. A first portion 124a of the lower member 124 overlapped by the first portion 115a of the dielectric layer 115 and disposed between the first protrusion 121 and the second protrusion 122 is referred to as a first transition region of the optical modulator 12. In some embodiments, the sub-region 463 is considered as an overlap region or a connecting portion of the first electrode and the first transition region. A second portion 124b of the lower member 124 overlapped by the second portion 115b of the dielectric layer 115 and disposed between the third protrusion 123 and the second protrusion 122 is referred to as a second transition region of the optical modulator 12. In some embodiments, the sub-region 453 is considered as an overlap region or a connecting portion of the second electrode and the second transition region. The second protrusion 122 and a portion of the lower member 124 overlapped by the second protrusion 122 are together referred to as a core region of the optical modulator 12. In some embodiments, the sub-region 412 is considered as an overlap region or a connecting portion of the core region and the first transition region. In some embodiments, the sub-region 422 is considered as an overlap region or a connecting portion of the core region and the second transition region.

The first electrode and the second electrode are for inputting and outputting an electrical signal (or current), and the core region is for a purpose of optical signal transmission or for functioning as a waveguide. Due to a greater doping concentration of the third sub-region 453 of the fifth doping region 45 of the second electrode, the optical modulator 12 of the present disclosure provides a pathway of the electrical signal (or current) with a lower resistance between the electrode and the transition region compared to other optical modulators with an absence of the third sub-region 453. Similarly, the third sub-region 463 of the sixth doping region 46 of the second electrode provides a benefit of a lower electrical resistance of the optical modulator 12. In addition, the second sub-region 412 of the first doping region 41 is in a connecting portion of the first transition region and the core region, and thus the doping gradient of the second sub-region 412 of the first doping region 41 can provide a lower electrical resistance between the core region and the first transition region without affecting an effective index of the core region. Similarly, the doping gradient of the second sub-region 422 of the second doping region 42 can provide a lower electrical resistance between the core region and the first transition region without affecting an effective index of the core region. An overall electrical resistance of the optical modulator 12 can thereby be reduced or minimized.

In some embodiments, one or more annealing operations are performed after the implantations shown in FIGS. 6 to 7 and 10 to 13. In some embodiments, dopants of the first doping region 41 diffuse into a portion of the insulating layer 112 overlapped by the first doping region 41 during the annealing operation(s). In some embodiments, dopants of the first doping region 41 diffuse into the first portion 115a of the dielectric layer 115 during the annealing operation(s). In some embodiments, a concentration of the first dopants in the portion of the insulating layer 112 overlapped by the first doping region 41 is less than an overall doping concentration of the first doping region 41 by at least a factor of 100. In some embodiments, the concentration of the first dopants in the portion of the insulating layer 112 overlapped by the first doping region 41 is less than 1.0E18 per cm³. In some embodiments, a concentration of the first dopants in the first portion 115a of the dielectric layer 115 is less than the overall doping concentration of the first doping region 41 by at least a factor of 100. In some embodiments, the concentration of the first dopants in the first portion 115a of the dielectric layer 115 overlapped by the first doping region 41 is less than 2.0E18 per cm³.

Similarly, in some embodiments, dopants of the second doping region 42 diffuse into a portion of the insulating layer 112 overlapped by the second doping region 42 during the annealing operation(s). In some embodiments, dopants of the second doping region 42 diffuse into the second portion 115b of the dielectric layer 115 during the annealing operation(s). In some embodiments, a concentration of the second dopant in the portion of the insulating layer 112 overlapped by the second doping region 42 is less than the overall doping concentration of the second doping region 42 by at least the factor of 100. In some embodiments, the concentration of the second dopant in the portion of the insulating layer 112 overlapped by the second doping region 42 is less than 1.0E18 per cm³. In some embodiments, a concentration of the second dopant in the second portion 115b of the dielectric layer 115 is less than the overall doping concentration of the second doping region 42 by at least the factor of 100 to the second power per cm³. In some embodiments, the concentration of the second dopant in the second portion 115b of the dielectric layer 115 overlapped by the second doping region 42 is less than 2.0E18 per cm³.

Figure 15:
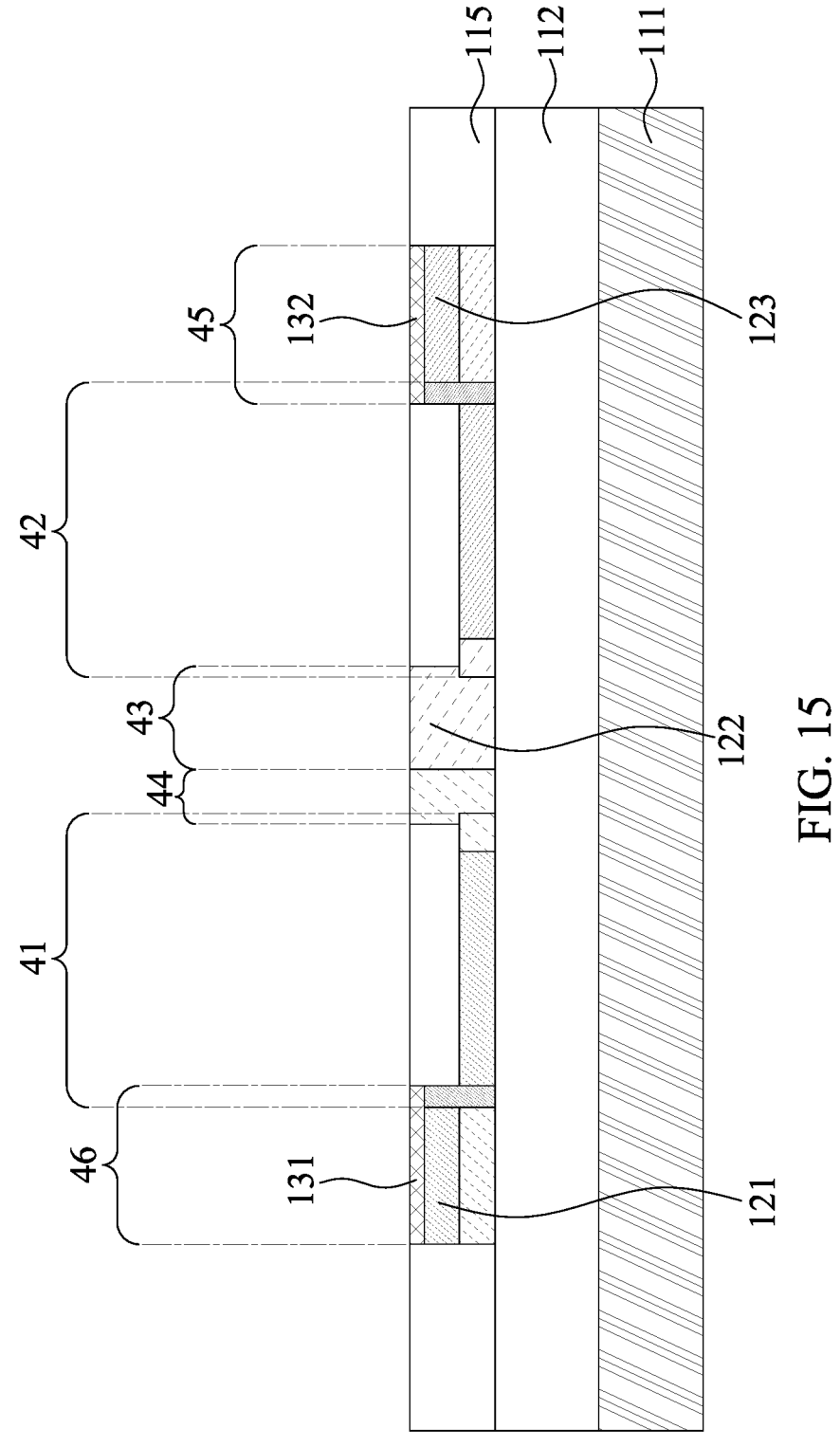

Referring to FIG. 15, silicide layers 131 and 132 are formed over the first protrusion 121 and the third protrusion 123 (or the first and second electrodes). In some embodiments, a mask layer (not shown) is formed over the second protrusion 122 after the removal of the photoresist layer 216. In some embodiments, a silicidation is performed on exposed surfaces of the first protrusion 121 and the third protrusion 123. In some embodiments, the silicide layers 131 and 132 are formed concurrently by the silicidation. In some embodiments, the silicide layer 131 covers an entirety of the first protrusion 121. In some embodiments, the silicide layer 132 covers an entirety of the third protrusion 123.

Figure 16:
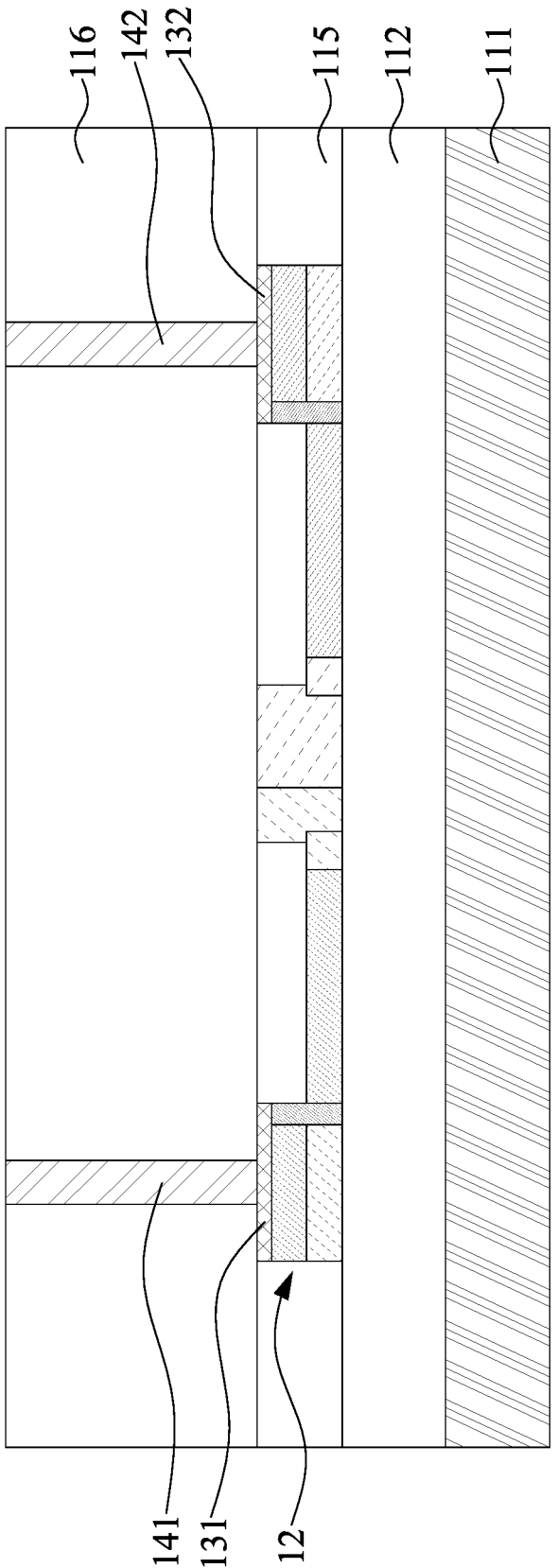

Referring to FIG. 16, a dielectric layer 116 is formed over the optical modulator 12, and contacts 141 and 142 are formed penetrating the dielectric layer 116. The contacts 141 and 142 are for a purpose of electrical connection to the first electrode and the second electrode, respectively, of the optical modulator 12. In some embodiments, the contact 141 is aligned with and electrically connected to the silicide layer 131. In some embodiments, the contact 141 is formed after the formation of the dielectric layer 116. In some embodiments, a portion of the dielectric layer 116 over the silicide layer 131 is removed, and the contact 141 is formed therewithin. In some embodiments, the contact 141 is formed by a deposition or a plating operation. The contact 142 can be formed concurrently with the contact 141 by same operation(s). Each of the contacts 141 and 142 can include one or more conductive materials. For example, the conductive material may include at least one of tungsten (W), aluminum (Al), copper (Cu), silver (Ag), gold (Au), titanium (Ti), tantalum (Ta), ruthenium (Ru), titanium-nitride (TiN), tantalum-nitride (TaN), ruthenium nitride (RuN), tungsten nitride (WN), and alloys thereof. The dielectric layer 116 may include a dielectric material that is same as or different from that of the dielectric layer 115 depending on applications.

Figure 17:
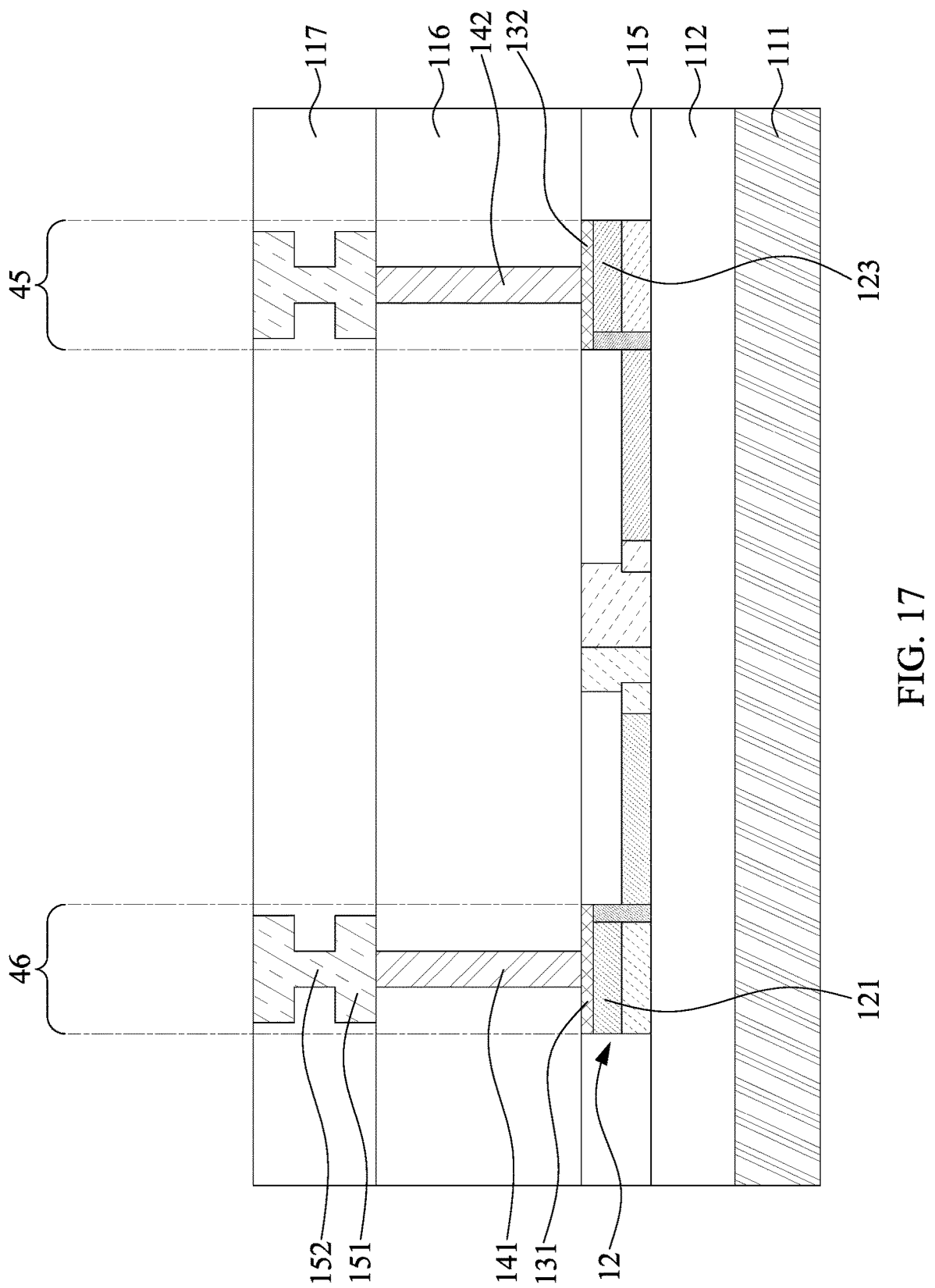

Referring to FIG. 17, an interconnect structure including a dielectric layer 117, a plurality of conductive lines 151, and a plurality of conductive vias 152 is formed over the dielectric layer 116. A conventional method for forming an interconnect structure can be applied. In some embodiments, the dielectric layer 117 includes multiple sub-layers of dielectric materials. Each of the conductive lines 151 and each of the conductive vias 152 are surrounded by the dielectric layer 117. In some embodiments, different layers of the conductive lines 151 are electrically connected by the conductive vias 152. In some embodiments, the contacts 141 and 142 connect to a bottom-most layer of the conductive lines 151. The conductive lines 151 and the conductive vias 152 may have same conductive material(s). The conductive material may be selected from the list of conductive materials of the contact 141 or 142 as described above. In some embodiments, the conductive lines 151 or the conductive vias 152 include conductive materials different from that of the contact 141 or 142.

Figure 18:
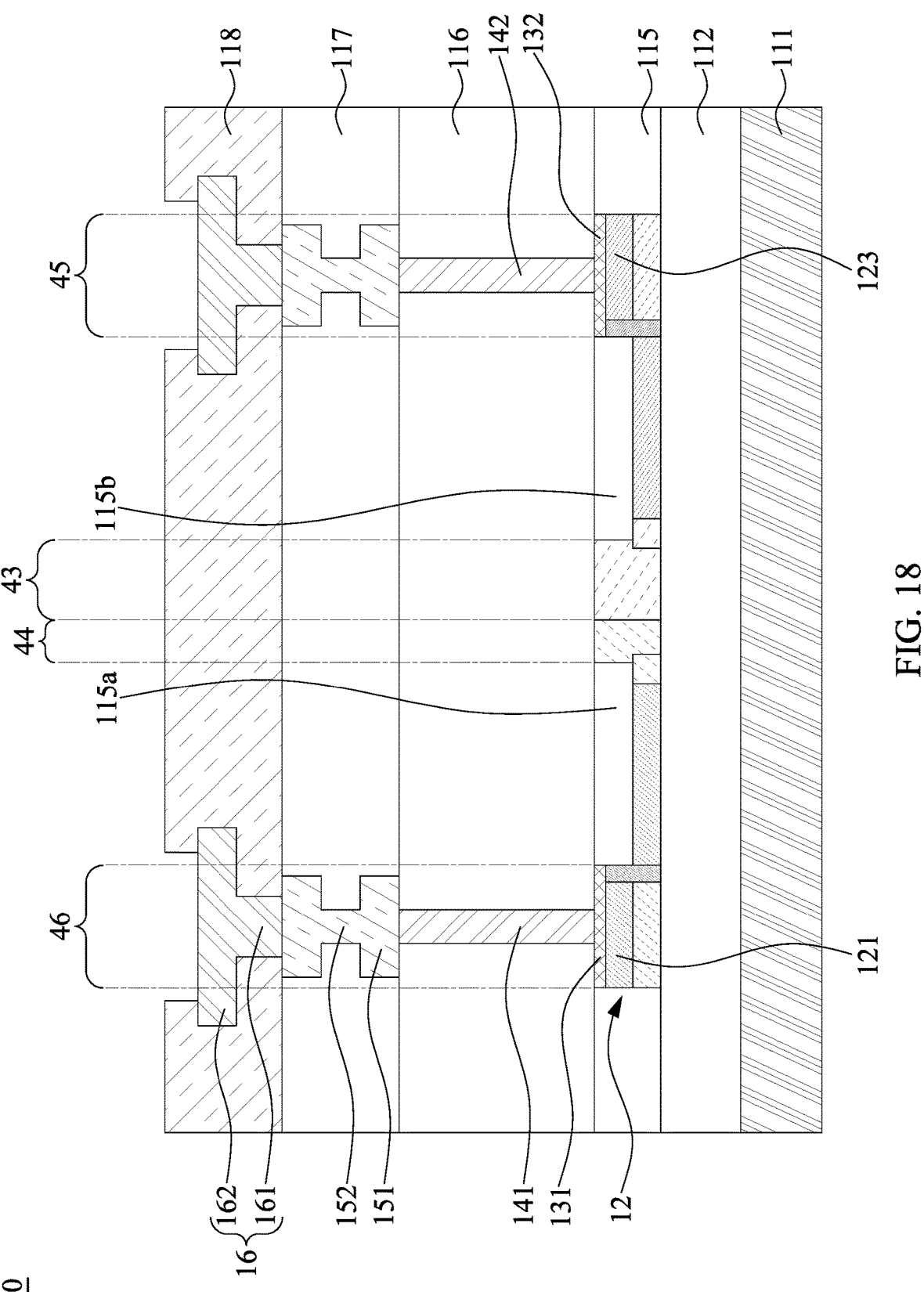

Referring to FIG. 18, a passivation layer 118 and a connector structure 16 surrounded by the passivation layer 118 are formed over the interconnect structure. In some embodiments, the passivation layer 118 includes nitride, polyimide, or a combination thereof. In some embodiments, the passivation layer 118 is formed by a deposition operation. In some embodiments, the deposition operation includes a chemical vapor deposition (CVD), a physical vapor deposition (PVD), an atomic layer deposition (ALD), a low-pressure chemical vapor deposition (LPCVD), a plasma-enhanced CVD (PECVD), or a combination thereof. In some embodiments, the passivation layer 118 is a multi-layer structure. The connector structure 16 may be formed by one or more depositions of a conductive material. In some embodiments, portions of the passivation layer 116 are removed prior to the deposition of the conductive material. In some embodiments, the conductive material of the connector structure 16 includes aluminum (Al), copper (Cu), tungsten (W), titanium (Ti), tantalum (Ta), titanium aluminum alloy (TiAl), titanium aluminum nitride (TiAlN), tantalum carbide (TaC), tantalum carbon nitride (TaCN), tantalum silicon nitride (TaSiN), manganese (Mn), zirconium (Zr), titanium nitride (TiN), tungsten nitride (WN), tantalum nitride (TaN), ruthenium (Ru), titanium silicon nitride (Ti-SiN), other suitable materials, or a combination thereof. In some embodiments, the connector structure 16 includes a via portion 161 and a pad portion 162. The connector structure 16 is for a purpose of electrical connection to the first and second electrodes of the optical modulator 12. In some embodiments, the connector structure 16 is electrically connected to the conductive lines 151 in a topmost layer of the interconnect structure. In some embodiments, the pad portion 162 of the connector structure 16 is exposed through the passivation layer 118 for electrical connection to another chip, an electric device, an electrical component, or a power source. A semiconductor structure 100 including the optical modulator 12 is thereby formed.

As illustrated above, a conventional modulator may not include the third sub-regions 453 and 463 of the doping regions 45 and 46 as shown in FIG. 14, and thus the optical modulator 12 of the present disclosure can provide a comparatively lower electrical resistance. In addition, the second sub-regions 412 and 422 of the doping regions 41 and 42 formed by the tilt implantations as depicted in FIGS. 6 and 7 can also provide lower electrical resistances. An overall electrical resistance of the optical modulator 12 can be minimized, and thus a transmission speed of the optical modulator 12 can be thereby improved.

In addition to the structural advantages of the optical modulator 12, the method of manufacturing the semiconductor structure 100 as depicted in FIGS. 1 to 18 of the present disclosure can prevent or minimize structural defects resulting from the manufacturing process.

In a conventional method of forming an optical modulator, implantation of a transition region of the optical modulator is performed after formation of the dielectric layer 115, and it is necessary to perform multiple cycles of implantations to achieve the designed doping concentration of the transition region. A photoresist functioning as a mask for the multiple cycles of implantations is deteriorated by the implantations, and portions of the photoresist layer are easily left remaining on the optical modulator after a removal operation of the photoresist layer. A performance of the optical modulator can be affected by residues of the photoresist. In addition, the multiple cycles of implantations result in high cost and long duration of the manufacturing process, and a semiconductive material of the optical modulator can be damaged by the multiple cycles of implantations.

The method of the present disclosure includes performing the formation of the transition region (e.g., the doping regions 41 and 42) prior to the formation of the dielectric layer 115, and thus a number of cycles of the implantations and a duration of the implantations can be reduced due to an absence of dielectric material over the transition region. Therefore, the above-described issues of the conventional method can be prevented. In addition, the formation of the transition region of the present disclosure includes tilted implantation so as to minimize electrical resistances as illustrated above. Performance and an operation speed of the optical modulator of the present disclosure is thereby improved.

FIGS. 19 to 23 are cross-sectional diagrams of a semiconductor structure at different stages of a method of manufacturing a semiconductor structure having an optical modulator similar to the optical modulator 12 described above in accordance with alternative embodiments of the present disclosure. In the method as depicted in FIGS. 1 to 18, the hard mask layer 114 is removed after the formation of the doping regions 41 and 42. In alternative embodiments, the hard mask layer 114 can be removed prior to the formation of the doping regions 41 and 42.

For a purpose of clarity and simplicity, reference numbers of elements with same or similar functions are repeated in different embodiments. However, such usage is not intended to limit the present disclosure to specific embodiments or specific elements. In addition, conditions or parameters illustrated in different embodiments can be combined or modified to form different combinations of embodiments as long as the parameters or conditions used are not in conflict.

Referring to FIG. 19, the hard mask layer 114 is removed after the formation of the optical modulating structure 12 as shown in FIG. 3, and an oxide layer 126 is formed over exposed surfaces of the optical modulating structure 12. A top surface 121A of the first protrusion 121, a top surface 122A of the second protrusion 122, and a top surface 123A of the third protrusion 123 are exposed, and the oxide layer 126 is conformal to the optical modulating structure 12. In some embodiments, the oxide layer 126 covers an entirety of the optical modulating structure 12. Structural defects on the top surfaces 121A, 122A and 123A resulting from previous processing can be removed.

Figure 20:
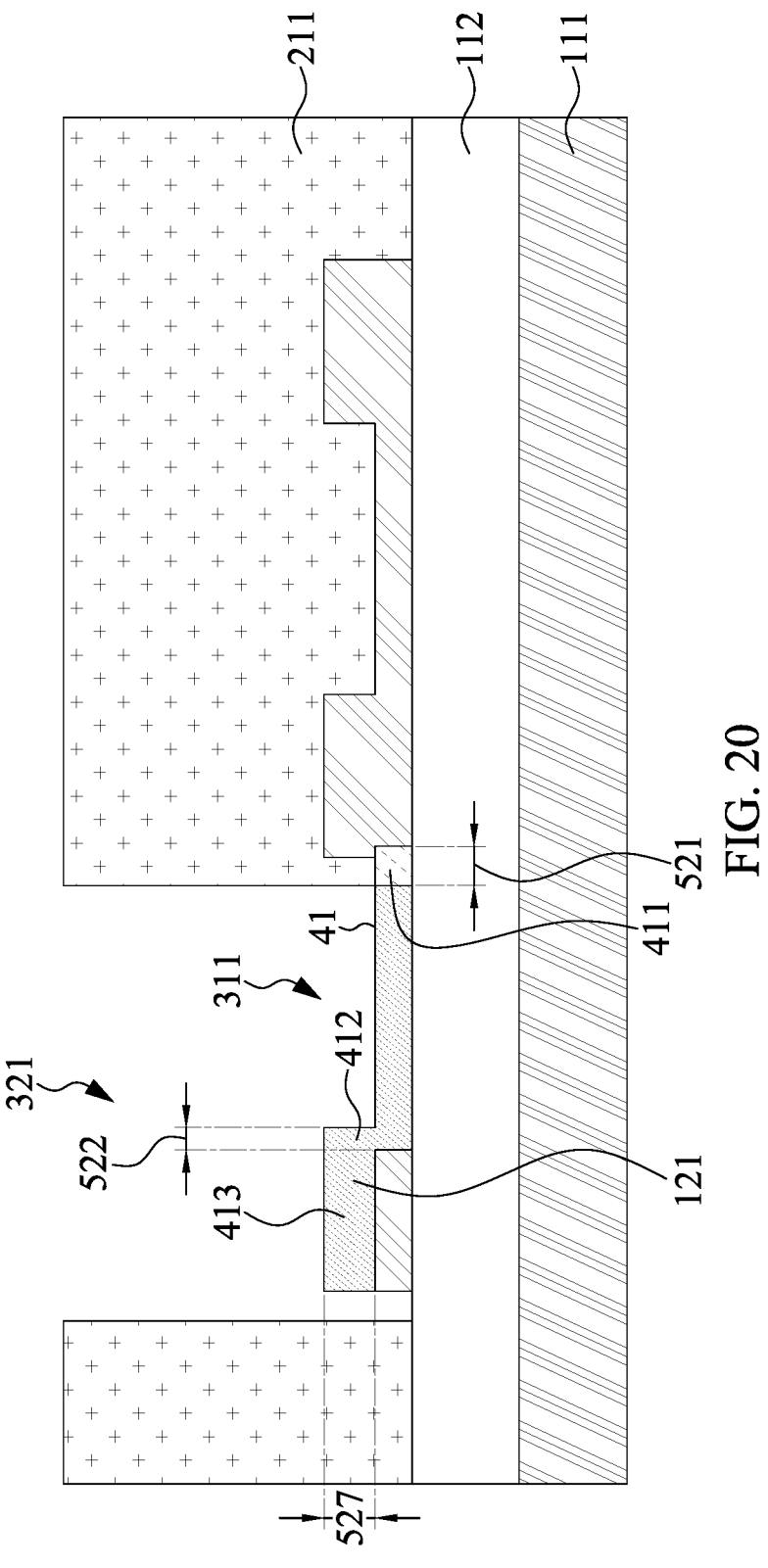

Referring to FIG. 20, operations as depicted in FIG. 6 are performed on the intermediate structure of FIG. 19. It should be noted that the oxide layer 126 is omitted from the figures for a purpose of simplicity of the figures, and such omission is not intended to limit the present disclosure. In some embodiments, due to an absence of the hard mask layer 114, the first doping region 41 further includes a third sub-region 413 formed at a surficial portion of the first protrusion 121. In some embodiments, the third sub-region 413 has a depth 527 from the top surface 121A of the first protrusion 121, wherein the depth 527 is in a range of 400 to 1500 Å.

Figure 21:
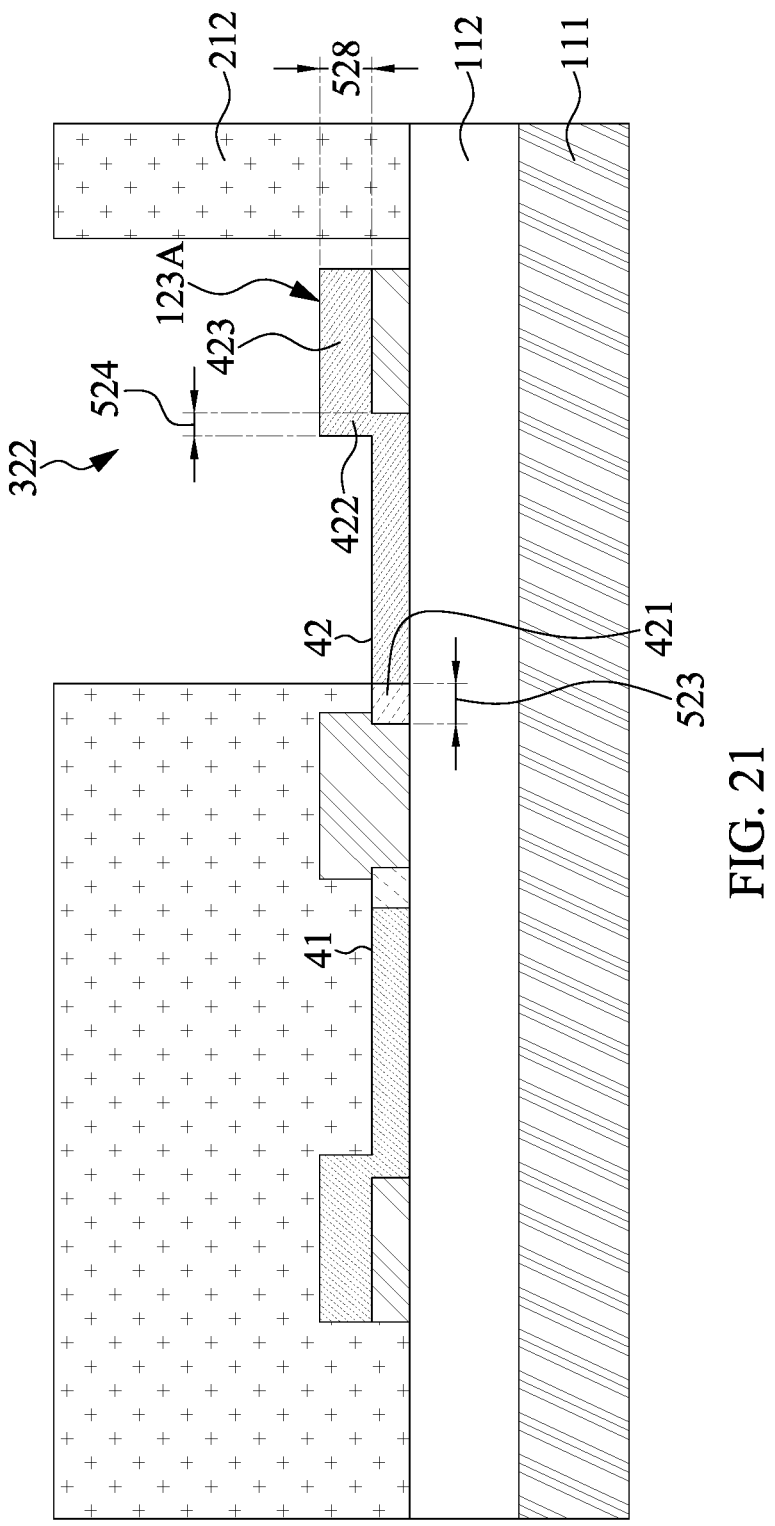

Referring to FIG. 21, operations as depicted in FIG. 7 are performed on the intermediate structure of FIG. 20. In some embodiments, due to the absence of the hard mask layer 114, the second doping region 42 further includes a third sub-region 423 formed at a surficial portion of the third protrusion 123. In some embodiments, the third sub-region 423 has a depth 528 from the top surface 123A of the third protrusion 123, wherein the depth 528 is in a range of 400 to 1500 Å.

Figure 22:
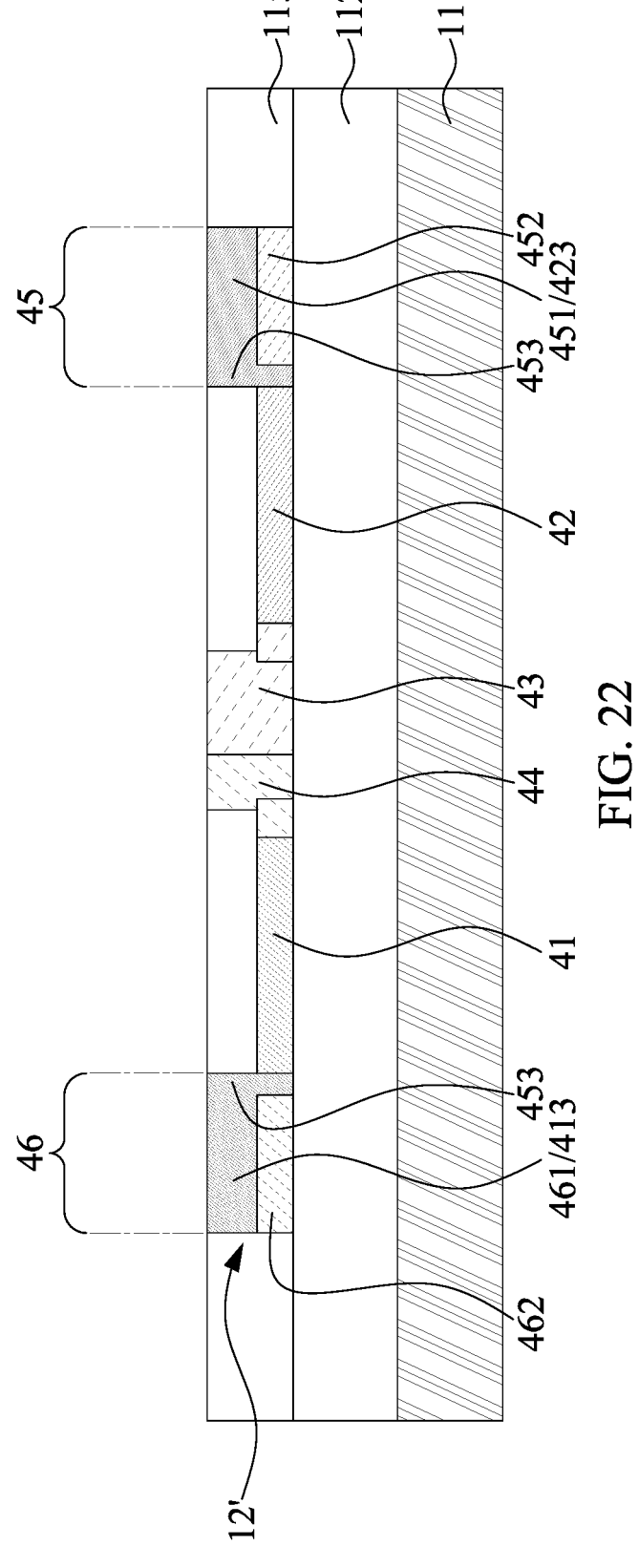

Referring to FIG. 22, operations as depicted in FIGS. 9 to 14 are performed on the intermediate structure of FIG. 21, and an optical modulator 12' is thereby formed. In some embodiments, the surficial portions of the first protrusion 121 and the third protrusion 123 are implanted twice by the implantations as depicted in the FIGS. 20 to 21 and fifth and sixth implantations as depicted in FIGS. 12 to 13. In some embodiments, a sixth doping region 46 includes a first sub-region 461 overlapping the third sub-region 413 of the first doing region 41. In some embodiments, a fifth doping region 45 includes a first sub-region 451 overlapping the third sub-region 423 of the second doing region 42. A doping concentration of the first sub-region 461 of the sixth doping region 46 of the optical modulator 12' may be greater than the doping concentration of the first sub-region 461 of the sixth doping region 46 of the optical modulator 12 shown in FIG. 14. Similarly, a doping concentration of the first sub-region 451 of the fifth doping region 45 of the optical modulator 12' may be greater than the doping concentration of the first sub-region 451 of the fifth doping region 45 of the optical modulator 12 shown in FIG. 14. An electrical resistance of the optical modulator 12' can be further reduced due to greater doping concentrations and better electrical conductivity of the first sub-regions 451 and 461.

Figure 23:
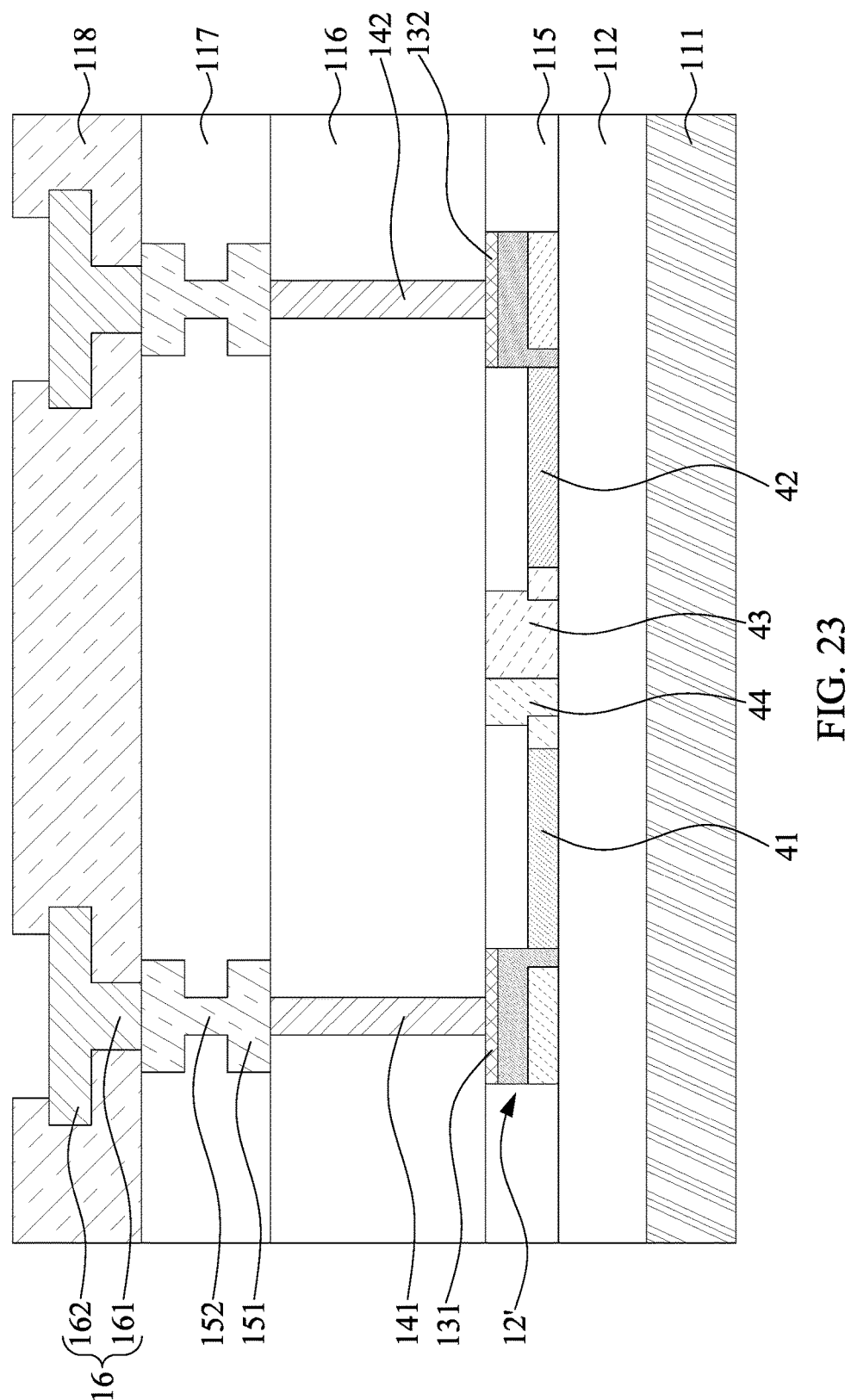

Referring to FIG. 23, operations as depicted in FIGS. 15 to 18 are performed on the intermediate structure of FIG. 22, and a semiconductor structure 101 is thereby formed. The semiconductor structure 101 can be similar to the semiconductor structure 100 but includes the optical modulator 12' with greater doping concentrations of two electrodes.

Figure 24:
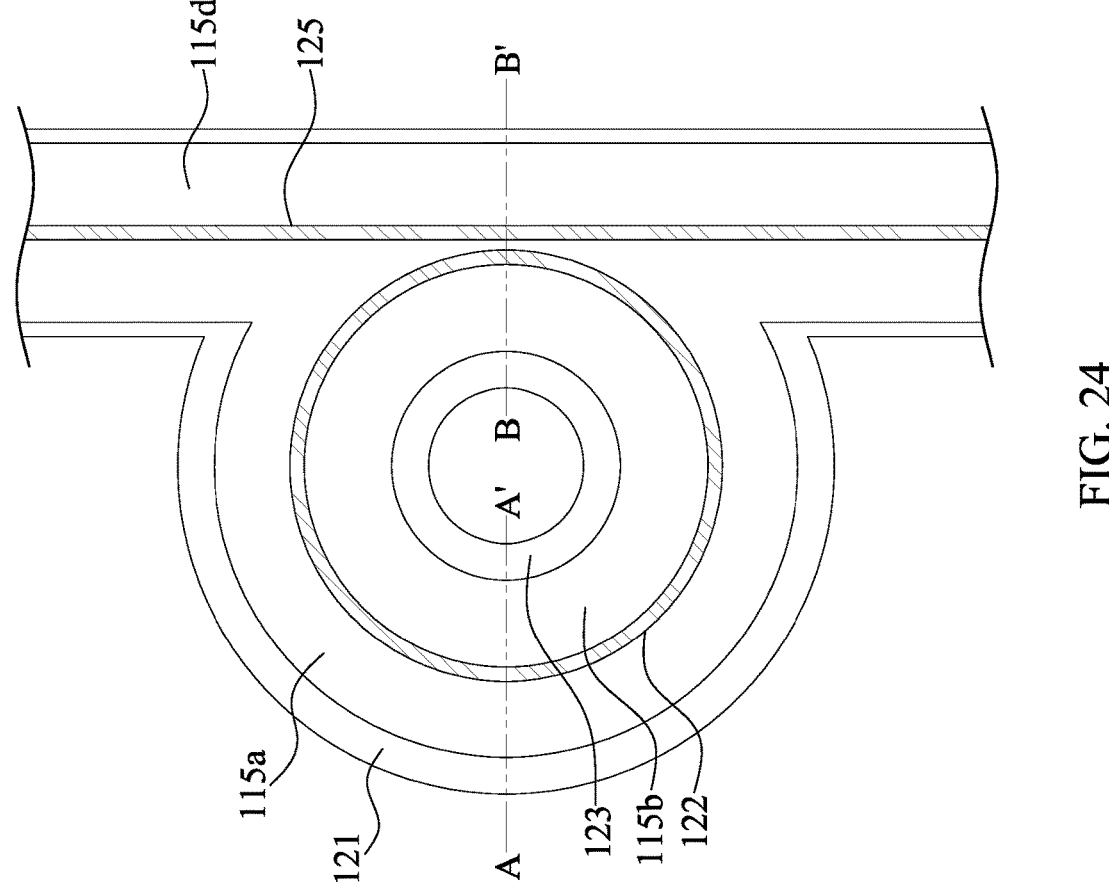
FIG. 24 is a schematic top-view perspective of a photonic modulator in accordance with some embodiments of the disclosure.

Referring to FIG. 24, a top-view perspective of a micro-ring modulating structure 102 is provided. The micro-ring modulating structure 102 may include the optical modulator 12 in FIG. 14 or the optical modulator 12' in FIG. 22. FIG. 14 can be a cross-sectional diagram along a line A-A' in FIG. 24 in accordance with some embodiments of the present disclosure. FIG. 22 can be a cross-sectional diagram along the line A-A' in FIG. 24 in accordance with other embodiments of the present disclosure. In some embodiments, the core region (e.g., the second protrusion 122) of the optical modulator 12 or 12' is a ring shape from the top view. In some embodiments, the first protrusion 121 is a C shape surrounding a portion of a ring shape of the first portion 115a of the dielectric layer 115 or a portion of a ring shape of the second protrusion 122. In some embodiments, the second protrusion 122 is a ring shape surrounding a ring shape of the second portion 115b of the dielectric layer 115 and a ring shape of the third protrusion 123. In some embodiments, the optical modulator 12 or 12' is adjacent to a waveguide portion 125. An optical signal may be input to one end of the waveguide portion 125 and output from another end of the waveguide portion 125.

Figure 25:
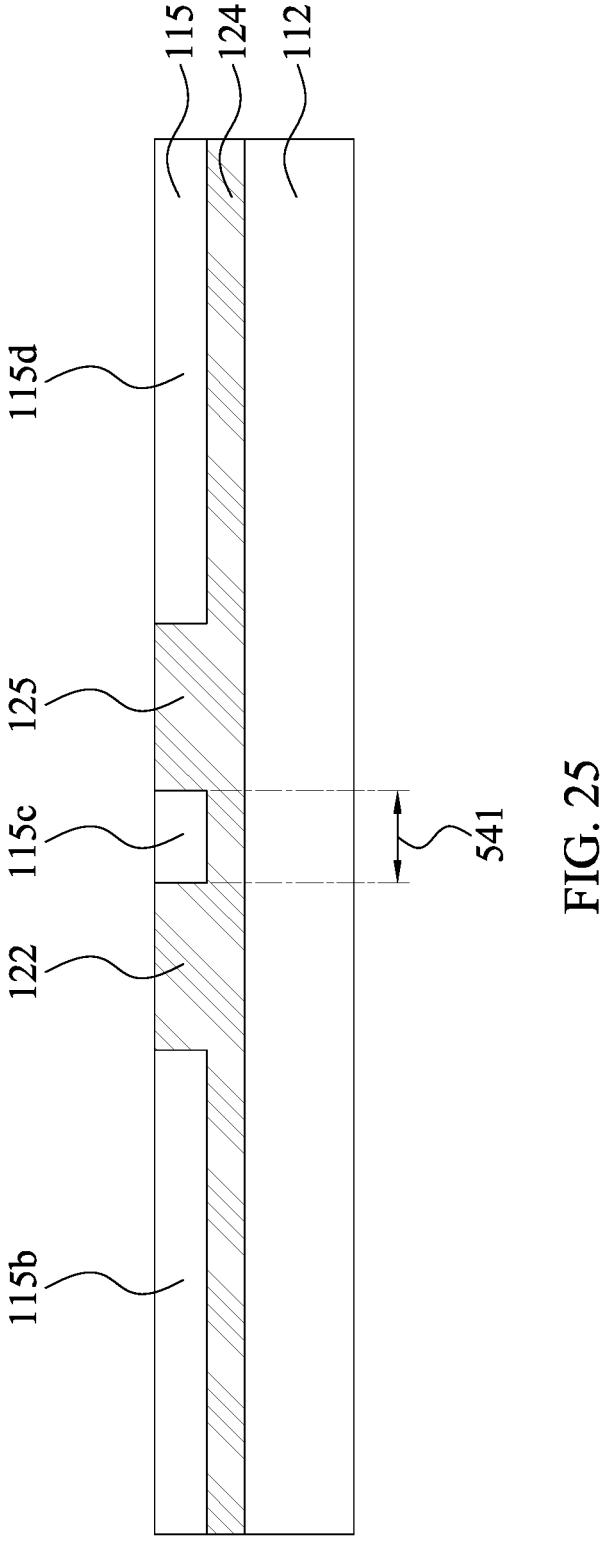
FIG. 25 is a schematic cross-sectional diagram along a line B-B' in FIG. 24 at a stage of a method of manufacturing a semiconductor structure.

Referring to FIG. 25, a schematic cross-sectional diagram along a line B-B' of the micro-ring modulating structure 102 in FIG. 24 is provided in accordance with some embodiments of the present disclosure. In some embodiments, the lower member 124 extends along the insulating layer 112 across the optical modulator 12 (or 12') and the waveguide portion 125. In some embodiments, the waveguide portion 125 connects to and protrudes from the lower member 124. The waveguide portion 125 may be separated from the second protrusion 122 by a third portion 115c of the dielectric layer 115. In some embodiments, the waveguide portion 125 is formed together with and concurrently with the protrusions 121, 122 and 123. In some embodiments, the waveguide portion 125 is defined and formed in the operations as depicted in FIG. 3. In some embodiments, the third portion 115c connects to the first portion 115a of the dielectric layer 115 from the top view in FIG. 24. In some embodiments, the dielectric layer 115 further includes a fourth portion 115d disposed over the lower member 124 and adjacent to the waveguide portion 125. In some embodiments, a width 541 of the third portion 115c (or a distance between the second protrusion 122 and the waveguide portion 125) is in a range of 200 to 500 Å.

Figure 26:
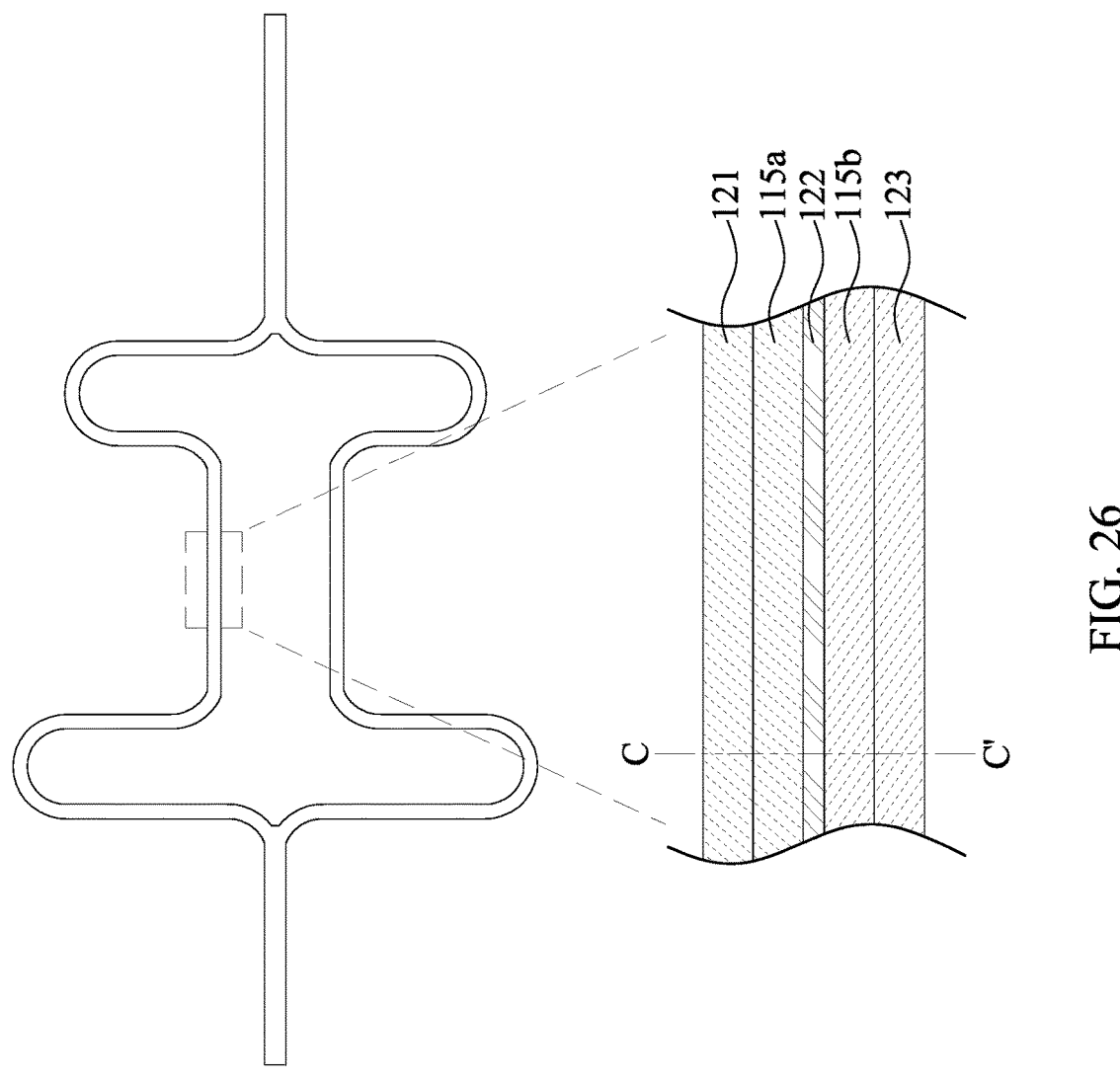
FIG. 26 is a schematic top-view perspective of a photonic modulator in accordance with some embodiments of the disclosure.

Referring to FIG. 26, a top-view perspective of a Mach-Zehnder modulating structure 104 is provided. An optical signal may be input to one end (left end or right end) of the Mach-Zehnder modulating structure 104 and output from another end (right end or left end) of the Mach-Zehnder modulating structure 104 shown in FIG. 26. In some embodiments, the optical modulator 12 (or 12') is disposed at a portion of the Mach-Zehnder modulating structure 104 as indicated by a square in FIG. 26, and an enlarged top view is also shown in a lower portion of FIG. 26. The optical modulator 12 or 12' in FIG. 14 or FIG. 22 can be a cross-sectional diagram along a line C-C' in FIG. 26 in accordance with some embodiments of the present disclosure.

To conclude the operations as illustrated in FIGS. 1 to 18 and FIGS. 19 to 23 above, a method 600 and a method 700 within a same concept of the present disclosure are provided.

FIG. 27 is a flow diagram of the method 600 for manufacturing a semiconductor structure in accordance with some embodiments of the present disclosure. The method 600 includes a number of operations (601, 602, 603, 604 and 605) and the description and illustration are not deemed as a limitation to the sequence of the operations. In the operation 601, a substrate is received, wherein the substrate includes a semiconductive material layer over an insulating layer. In the operation 602, the semiconductive material layer is patterned so as to define an optical modulating structure, wherein the optical modulating structure includes a lower member extending along the insulating layer, a first protrusion over the lower member, and a second protrusion over the lower member and separated from the first protrusion. In the operation 603, a first mask layer is formed over the optical modulating structure, wherein the first mask layer covers the second protrusion and a first portion of the lower member between the first protrusion and the second protrusion. In the operation 604, a first doping region is formed in an exposed portion of the lower member and at least a portion of an exposed sidewall of the first protrusion. In the operation 605, a dielectric layer is formed between the first protrusion and the second protrusion.

Figure 28:
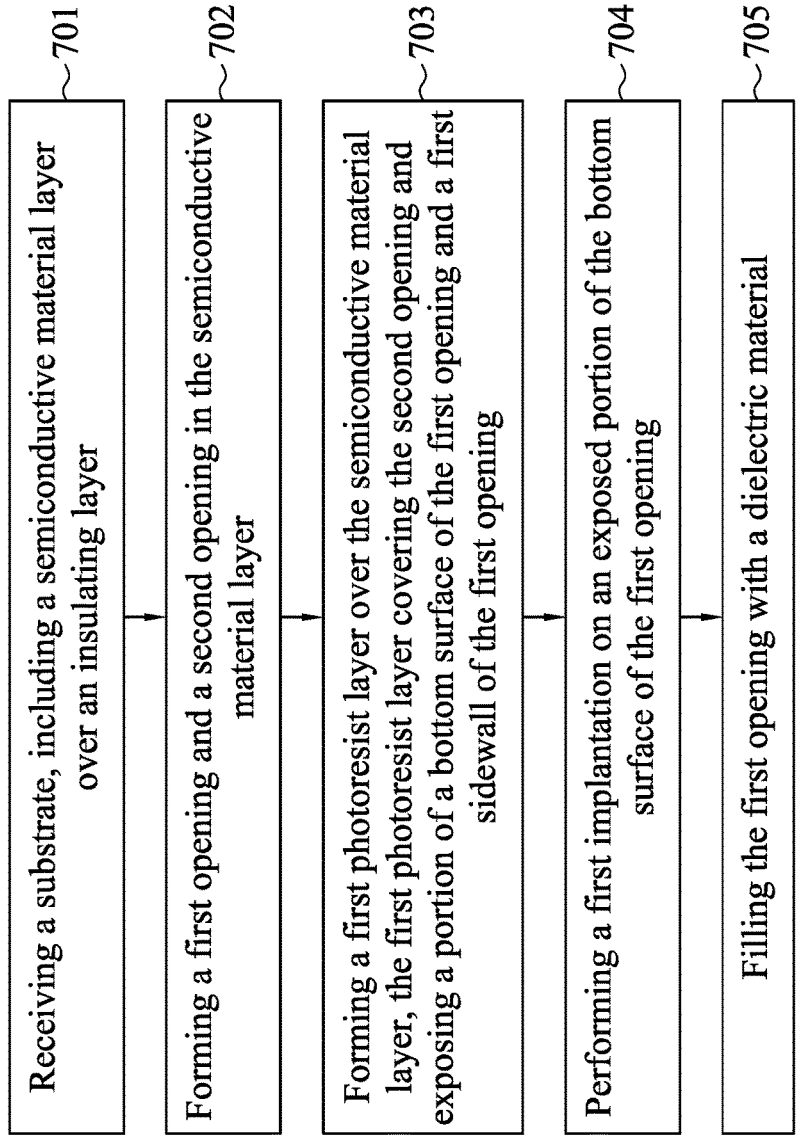

FIG. 28 is a flow diagram of the method 700 for manufacturing a semiconductor structure in accordance with some embodiments of the present disclosure. The method 700 includes a number of operations (701, 702, 703, 704 and 705) and the description and illustration are not deemed as a limitation to the sequence of the operations. In the operation 701, a substrate is received, wherein the substrate includes a semiconductive material layer over an insulating layer. In the operation 702, a first opening and a second opening are formed in the semiconductive material layer. In the operation 703, a first photoresist layer is formed over the semiconductive material layer, wherein the first photoresist layer covers the second opening and exposes a portion of a bottom surface of the first opening and a first sidewall of the first opening. In the operation 704, a first implantation is performed on an exposed portion of the bottom surface of the first opening. In the operation 705, the first opening is filled with a dielectric material.

It should be noted that the operations of the method 600 and/or the method 700 may be rearranged or otherwise modified within the scope of the various aspects. Additional processes may be provided before, during, and after the method 600 and/or the method 700, and some other processes may be only briefly described herein. Thus, other implementations are possible within the scope of the various aspects described herein.

In accordance with some embodiments of the disclosure, a method for manufacturing a semiconductor structure is provided. The method may include several operations. A substrate is received, wherein the substrate includes a semiconductive material layer over an insulating layer. The semiconductive material layer is patterned so as to define an optical modulating structure, wherein the optical modulating structure includes a lower member extending along the insulating layer, a first protrusion over the lower member, and a second protrusion over the lower member and separated from the first protrusion. A first mask layer is formed over the optical modulating structure, wherein the first mask layer covers the second protrusion and a first portion of the lower member between the first protrusion and the second protrusion. A first doping region is formed in an exposed portion of the lower member and at least a portion of an exposed sidewall of the first protrusion. A dielectric layer is formed between the first protrusion and the second protrusion.

In accordance with some embodiments of the disclosure, a method for manufacturing a semiconductor structure is provided. The method may include several operations. A substrate is received, wherein the substrate includes a semiconductive material layer over an insulating layer. A first opening and a second opening are formed in the semiconductive material layer. A first photoresist layer is formed over the semiconductive material layer, wherein the first photoresist layer covers the second opening and exposes a portion of a bottom surface of the first opening and a first sidewall of the first opening. A first implantation is performed on an exposed portion of the bottom surface of the first opening. The first opening is filled with a dielectric material.

In accordance with some embodiments of the disclosure, a semiconductor structure is provided. The semiconductor structure includes a photonic modulator, a first dielectric layer and a second dielectric layer. The photonic modulator includes a first electrode region, a second electrode region and a core region connected by a transition region, wherein the core region is disposed between the first electrode region and the second electrode region. The first dielectric layer is disposed under the photonic modulator. The second dielectric layer is disposed over the transition region, wherein a first doping concentration of the transition region is greater than a second doping concentration of the second dielectric layer vertically over the transition region by at least a factor of 100.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method of manufacturing a semiconductor structure, comprising:

receiving a substrate, including a semiconductive material layer over an insulating layer;

patterning the semiconductive material layer, thereby defining an optical modulating structure, wherein the optical modulating structure includes a lower member extending along the insulating layer, a first protrusion over the lower member, and a second protrusion over the lower member and separated from the first protrusion;

forming a first mask layer over the optical modulating structure, the first mask layer covering the second protrusion and a first portion of the lower member between the first protrusion and the second protrusion;

forming a first doping region in an exposed portion of the lower member and at least a portion of an exposed sidewall of the first protrusion, wherein a doping gradient is formed in the first portion of the lower member; and forming a dielectric layer between the first protrusion and the second protrusion.

2. The method of claim 1, further comprising:

forming a second mask layer over the optical modulating structure and the dielectric layer, the second mask layer exposing at least a portion of the first portion of the lower member and a first portion of the second protrusion adjacent to the first portion of the lower member; and forming a second doping region in the first portion of the second protrusion.

3. The method of claim 1, wherein the first doping region is formed by a tilt implantation.

4. The method of claim 3, wherein a tilt angle of the tilt implantation is in a range of 5 to 20 degrees.

5. The method of claim 1, further comprising:

forming a third mask layer over the optical modulating structure and the dielectric layer, the third mask layer exposing the first protrusion; and forming a third doping region in the first protrusion and a second portion of the lower member under the first protrusion, wherein the third doping region overlaps the first doping region in the portion of the exposed sidewall of the first protrusion.

6. The method of claim 5, wherein the third doping region has a greater doping concentration in the first protrusion and a lower doping concentration in the second portion of the lower member.

7. The method of claim 1, wherein the first doping region is formed by an implantation, and an energy of the implantation is in a range of 5 to 30 kiloelectron-volts (KeV).

8. The method of claim 1, wherein the first doping region is formed by an implantation, and a dosage of the implantation is in a range of 1.0E15 to 3.0E15 per square centimeter (cm²).

9. A method of manufacturing a semiconductor structure, comprising:

receiving a substrate, including a semiconductive material layer over an insulating layer;

forming a first opening and a second opening in the semiconductive material layer;

forming a first photoresist layer over the semiconductive material layer, the first photoresist layer covering the second opening and exposing a portion of a bottom surface of the first opening and a first sidewall of the first opening;

performing a first implantation on an exposed portion of the bottom surface of the first opening; and filling the first opening with a dielectric material.

10. The method of claim 9, wherein the first implantation is performed with an angle in a range of 0 to 20 degrees.

11. The method of claim 9, wherein the first implantation is performed on at least a portion of the first sidewall of the first opening, and results in a doping gradient in a portion of the semiconductive material layer adjacent to a second sidewall opposite to the first sidewall of the first opening.

12. The method of claim 9, further comprising:

forming a second photoresist layer over the semiconductive material layer, the second photoresist layer exposing a portion of a bottom surface of the second opening and a first sidewall of the second opening; and performing a second implantation on an exposed portion of the bottom surface of the second opening, wherein the second implantation and the first implantation include different types of dopants.

13. The method of claim 12, wherein the second implantation is performed on at least a portion of the first sidewall of the second opening, and results in a doping gradient in a portion of the semiconductive material layer adjacent to a second sidewall opposite to the first sidewall of the second opening.

14. The method of claim 9, wherein the first opening and the second opening are defined by a hard mask formed over the semiconductive material layer, and the first photoresist layer covers portions of the hard mask.

15. The method of claim 14, wherein the hard mask is removed after the formation of the dielectric material.

16. A semiconductor structure, comprising:

a photonic modulator, comprising a first electrode region, a second electrode region and a core region connected by a transition region, wherein the core region is disposed between the first electrode region and the second electrode region;

a first dielectric layer, disposed under the photonic modulator; and a second dielectric layer, disposed over the transition region, wherein a first doping concentration of the transition region is greater than a second doping concentration of the second dielectric layer vertically over the transition region by at least a factor of 100, and wherein the transition region includes a third doping concentration less than a fourth doping concentration of the first electrode region, and an overlap portion of the transition region and the first electrode region includes a fifth doping concentration greater than the third doping concentration.

17. The semiconductor structure of claim 16, wherein the fifth doping concentration is greater than the fourth doping concentration.

18. The semiconductor structure of claim 16, wherein the transition region overlaps the first electrode region by a width in a range of 0.5 to 1.2 microns.

19. The semiconductor structure of claim 16, wherein the first doping concentration is in a range of 5.0E19 to 2.0E20 per cm³.

20. The semiconductor structure of claim 19, wherein the second doping concentration is less than 2.0E18 per cm³.

* * * * *